United States Patent
Kojima et al.

[11] Patent Number: 6,004,407
[45] Date of Patent: *Dec. 21, 1999

[54] HARD MAGNETIC MATERIALS AND METHOD OF PRODUCING THE SAME

[75] Inventors: Akinobu Kojima; Akihiro Makino, both of Nagaoka; Akihisa Inoue; Tsuyoshi Masumoto, both of 1-7 Yukigaya, Otsuka-cho, Ota-ku, Tokyo, all of Japan

[73] Assignees: Alps Electric Co., Ltd.; Akihisa Inoue; Tsuyoshi Masumoto, all of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/717,468

[22] Filed: Sep. 20, 1996

[30] Foreign Application Priority Data

Sep. 22, 1995 [JP] Japan ................................. 7-244982

[51] Int. Cl.⁶ ........................................ H01F 1/057
[52] U.S. Cl. ........................ 148/302; 420/83; 420/121
[58] Field of Search ........................ 148/302; 420/83, 420/121

[56] References Cited

U.S. PATENT DOCUMENTS

| | | | |
|---|---|---|---|
| 4,921,553 | 5/1990 | Tokunga et al. | 148/302 |
| 4,983,232 | 1/1991 | Endoh et al. | 148/302 |
| 5,022,939 | 6/1991 | Yajima et al. | 148/302 |
| 5,049,208 | 9/1991 | Yajima et al. | 148/302 |
| 5,089,065 | 2/1992 | Hamano et al. | 148/302 |

FOREIGN PATENT DOCUMENTS

| | | | |
|---|---|---|---|
| 0 274 034 | 7/1988 | European Pat. Off. | 148/302 |
| 0 306 928 | 3/1989 | European Pat. Off. | 148/302 |
| 0 306 981 | 3/1989 | European Pat. Off. | 148/302 |
| 4-98802 | 3/1992 | Japan | 148/302 |
| 6-151137 | 5/1994 | Japan | 148/302 |

*Primary Examiner*—John Sheehan
*Attorney, Agent, or Firm*—Brinks Hofer Gilson & Lione

[57] ABSTRACT

Hard magnetic materials of the present invention contain at least one element of Fe, Co and Ni as a main component, at least one element M of Zr, Nb, Ta and Hf, at least one rare earth element R and B. The texture of the materials has at least 70% of fine crystalline phase having an average grain size of 100 nm or less, and the residue having an amorphous phase, the fine crystalline phase mainly composed of bcc-Fe or bcc-Fe compound, Fe—B compound and/or $R_2Fe_{14}B_1$.

14 Claims, 25 Drawing Sheets

HARD MAGNETIC MATERIALS AND METHOD OF PRODUCING THE SAME

BACKGROUND OF THE INVENTION

1. Field of the Invention

The present invention relates to hard magnetic materials and a method of producing the materials with excellent magnetic performance which can be used for a motor, an actuator, a speaker, etc.

2. Description of the Related Art

Nd—Fe—B sintered magnets, Nd—Fe—B quenched magnets, etc. are generally known as magnet materials having performance superior to that of ferrite magnets, and many new alloy magnets such as Sm—Fe—N magnets and the like are investigated for attaining more excellent performance.

However, these magnet materials have the drawback that the need for at least 10 at % of Nd or at least 8 at % of Sm causes the need to use a large amount of expensive rare-earth element, and increases the production cost, as compared with ferrite magnets.

Although the ferrite magnets are lower in price than these rare-earth magnets, the ferrite magnets have insufficient magnetic characteristics.

There is thus demand for the appearance of low-cost magnet materials exhibiting more excellent hard magnetic characteristics than ferrite magnets.

SUMMARY OF THE INVENTION

The present invention has been achieved in consideration of the above situation, and an object of the present invention is to provide low-cost hard magnetic materials having excellent hard magnetic characteristics.

In order to achieve the object, in accordance with the present invention, there is provided a hard magnetic material comprising at least one element of Fe, Co and Ni as a main component, at least one element of Zr, Nb, Ta and Hf, at least one rare earth element, and B, wherein the texture comprises at least 70% of a fine crystalline phase having an average grain size of 100 nm or less, and the remainder comprising an amorphous phase, the fine crystalline phase mainly comprising bcc-Fe or bcc-Fe compound, Fe—B compound and/or $R_2Fe_{14}B_1$.

The hard magnetic material in accordance with the present invention preferably has a texture which mainly comprises an amorphous phase immediately after quenching, and the fine crystalline phase is then precipitated after heat treatment at 600 to 900° C.

The hard magnetic material in accordance with the present invention preferably has the following composition.

$$T_xM_yR_zB_w$$

wherein T indicates at least one element of Fe, Co and Ni; M indicates at least one element of Zr, Nb, Ta and Hf; R indicates at least one rare earth element; and x, y, z and w respectively indicate the composition ratios by atomic % within the ranges below.

$$86 \leq x, 0.5 \leq y \leq 3, 3 \leq z \leq 7, 3 \leq w \leq 7$$

The hard magnetic material of the present invention preferably has the following composition and remanent magnetization Ir of 120 emu/g or more.

$$T_xM_yR_zB_w$$

wherein T indicates at least one element of Fe, Co and Ni; M indicates at least one element of Zr, Nb, Ta and Hf; R indicates at least one rare earth element; and x, y, z and w respectively indicate the composition ratios by atomic % within the ranges below.

$$86 \leq x, 0.5 \leq y \leq 3, 3 \leq z \leq 7, 3 \leq w \leq 7$$

The hard magnetic material of the present invention preferably has the ratio Ir/Is of remanent magnetization to saturation magnetization of at least 0.7.

The hard magnetic material of the present invention preferably comprises the rare earth element R which is entirely or partly Nd and/or Pr.

The hard magnetic material of the present invention preferably comprises the rare earth element R which is Nd and/or Pr at a concentration of 4 to 5 atomic %.

In another aspect of the present invention, there is provided a method of producing hard magnetic materials comprising the steps of producing an amorphous alloy comprising Fe as a main component, at least one element M of Zr, Nb, Ta and Hf, at least one rare earth element R, and B; and performing heat treatment of the amorphous alloy at 600 to 900° C. to precipitate a fine crystalline phase having an average grain size of 100 nm or less and mainly comprising bcc-Fe, Fe—B compound and/or $R_2Fe_{14}B_1$.

DESCRIPTION OF THE PREFERRED EMBODIMENTS

Figure 1:
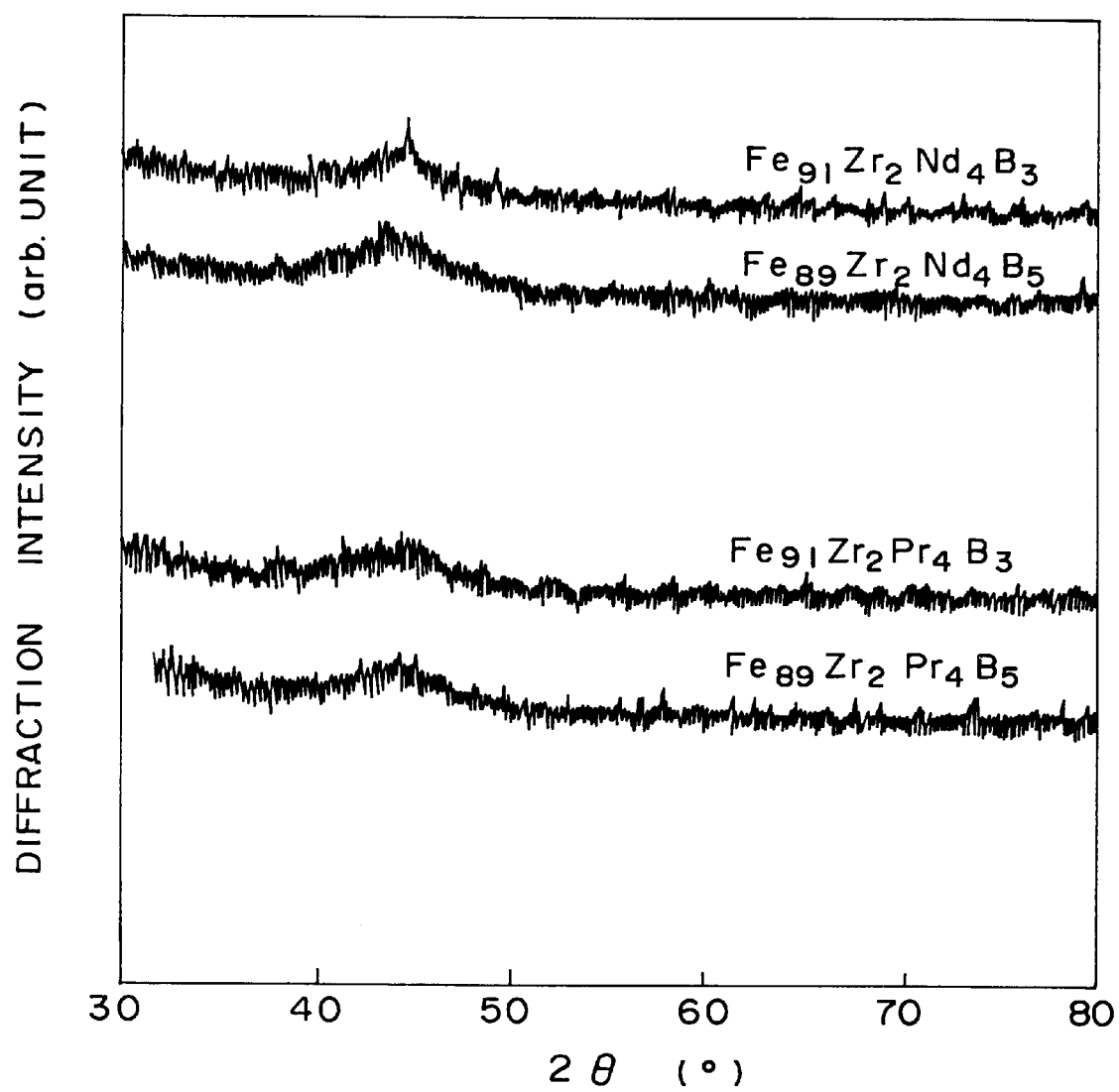
FIG. 1 is a diagram showing the results of X-ray diffraction of a hard magnetic material of the present invention immediately after quenching.

The present invention is described in detail below.

Hard magnetic materials of the present invention comprise at least one element of Fe, Co and Ni as a main component, at least one element M of Zr, Nb, Ta and Hf, at least one rare earth element R, and B. The texture of the hard magnetic materials comprises at least 70% of fine crystalline phase having an average grain size of 100 nm or less, and the remainder composed of an amorphous phase, the fine crystalline phase mainly comprising bcc (body-centered cubic structure) Fe, Fe—B compound and/or $R_2Fe_{14}B_1$ The hard magnetic materials can be obtained through the steps of forming an amorphous alloy mainly comprising an amorphous phase having the composition TxMyRzBw below; and performing heat treatment of the amorphous alloy at an appropriate temperature within the range of 600 to 900° C. to form the fine crystalline phase having an average grain size of 100 nm or less and comprising bcc-Fe, Fe—B compound and/or $R_2Fe_{14}B_1$.

As the method of obtaining the amorphous alloy, a method of quenching a molten metal by spraying it to a rotating drum to form a thin strip, a method of quenching droplets of a molten metal by spraying it into a cooling gas to form a powder, a sputtering method or a CVD method can be used.

The heat treatment of the amorphous alloy can be performed by using any desired heating means. For example, when a compact body is obtained from the hard magnetic materials of the present invention, a method is preferably used in which the amorphous alloy is first powdered, and the alloy powder is then pressure-formed by a hot press under heating at a predetermined temperature.

The preferred composition of the hard magnetic materials of the present invention is described below. The hard magnetic materials of the present invention can be represented by TxMyRzBw.

T indicates at least one element of Fe, Co and Ni which are main components of the hard magnetic materials of the present invention and which have magnetism.

Saturation magnetization Is is increased as the composition ratio x of component T is increased. In order to realize high remanent magnetization (Ir) of 120 emu/g or more, a saturation magnetization (Is) of at least 130 emu/g is required, and the T content must be at least 86 at % in order to satisfy this saturation magnetization.

M indicates at least one element of Zr, Nb, Ta and Hf which have the high ability to form an amorphous phase. Even at a low content of the rare earth element (R), an amorphous phase can be formed by adding element M to the hard magnetic materials of the present invention. As the composition ratio y of element M is increased by substituting rare earth element (R) with element M, the remanent magnetization (Ir) is increased, but coercive force (iHc) is decreased, and hard magnetic characteristics are changed to soft magnetic characteristics. If the ratio of M is increased by substituting element T with element M, saturation magnetization (Is) and remanent magnetization (Ir) are decreased.

In order to obtain good hard magnetic characteristics, the M content is preferably within the range of 0.5 to 3 at %.

R indicates at least one of the rare earth elements (Sc, Y, La, Ce, Pr, Nd, Pm, Sm, Eu, Gd, Tb, Dy, Ho, Er, Tm, Yb and Lu). The intermetallic compound $R_2Fe_{14}B_1$ which is precipitated by heating the amorphous alloy comprising R, Fe and B at an appropriate temperature within the range of 600 to 900° C. imparts excellent hard magnetic characteristics to the materials of the present invention.

As the composition ratio z of element R is increased, remanent magnetization (Ir) is decreased. In order to obtain high remanent magnetization (Is) of at least 20 emu/g, saturation magnetization (Is) of at least 130 emu/g is required, and the R content (z) is preferably 7 at % or less for satisfying this saturation magnetization.

The element R easily forms the amorphous phase, and the R content is preferably at least 3 at % in order to obtain the amorphous phase or fine crystalline phase.

If the rare earth element R entirely or partly comprises Nd and/or Pr, higher hard magnetic characteristics.

The hard magnetic materials of the present invention contains B as an element which easily forms the amorphous phase. The compound $R_2Fe_{14}B_1$ precipitated by heating the amorphous phase containing Fe and B at an appropriate temperature within the range of 600 to 900° C. imparts hard magnetic characteristics to the materials of the present invention.

In order to obtain the amorphous phase or the fine crystalline phase, the B content is preferably 3 at % or more. However, since, as the composition ratio (w) of element B is increased, the saturation magnetization (Is), the remanent magnetization (Ir) and the coercive force (iHc) are decreased, the B content is preferably 7 at % or less in order to obtain good hard magnetic characteristics.

Since the hard magnetic materials of the present invention contain not more than 7 at % or rare earth element, it can be produced at a relatively low production cost. Even if the content of rare earth elements is decreased to 5 at % or less, a high remanent magnetization (Ir) of 120 emu/g or more can be attained.

The hard magnetic materials exhibit exchange coupling magnet characteristics obtained by coupling fine soft magnetic phase and hard magnetic phase, which are obtained by realizing a fine texture. Since the Fe content is higher than that of a conventional rare earth magnet, higher saturation magnetization (Is) and remanent magnetization (Ir) are obtained. The hard magnetic materials of the present invention have a high remanence ratio of Ir/Is $\geq 0.7$ in accordance with the composition ratios of the respective elements and the heating temperature.

EXAMPLES

Alloy thin strips having various compositions were formed in a thickness of about 20 $\mu$m as described below.

An ingot was first formed by an arc melting method, and a molten metal was sprayed onto a rotating Cu roll in an Ar atmosphere to form a quenched thin strip having a thickness of about 20 $\mu$m.

The thus-obtained quenched thin strip was then heated at a predetermined temperature for about 180 seconds in an atmosphere of $1 \times 10^{-2}$ Pa or less.

The magnetic characteristics of the resultant alloy thin strip sample were measured by using VSM (vibrating sample type magnetometer) in the applied magnetic field of 1430 kA/m at room temperature. Although the magnetization of some samples was not saturated in the applied magnetic field of 1430 kA/m, the magnetization of such samples was considered as saturation magnetization in this description. The texture structure was measured by an X-ray diffraction meter using Cu—Ka rays and a high-resolution transmission electron microscope.

FIG. 1 shows the results of X-ray diffraction of the thin strip samples immediately after quenching. This diagram indicates that any one of $Fe_{91}Zr_2Nd_4B_3$, $Fe_{89}Zr_2Nd_4B_5$, $Fe_{91}Zr_2Pr_4B_3$ and $Fe_{89}Zr_2Pr_4B_5$ within the composition range of the present invention forms an amorphous phase immediately after quenching in spite of the fact that the content of the rare earth element R (Nd or Pr) is as low as 4 at %. Even when Zr was changed to Nb, Ta or Hf, the same results were obtained.

Figure 2:
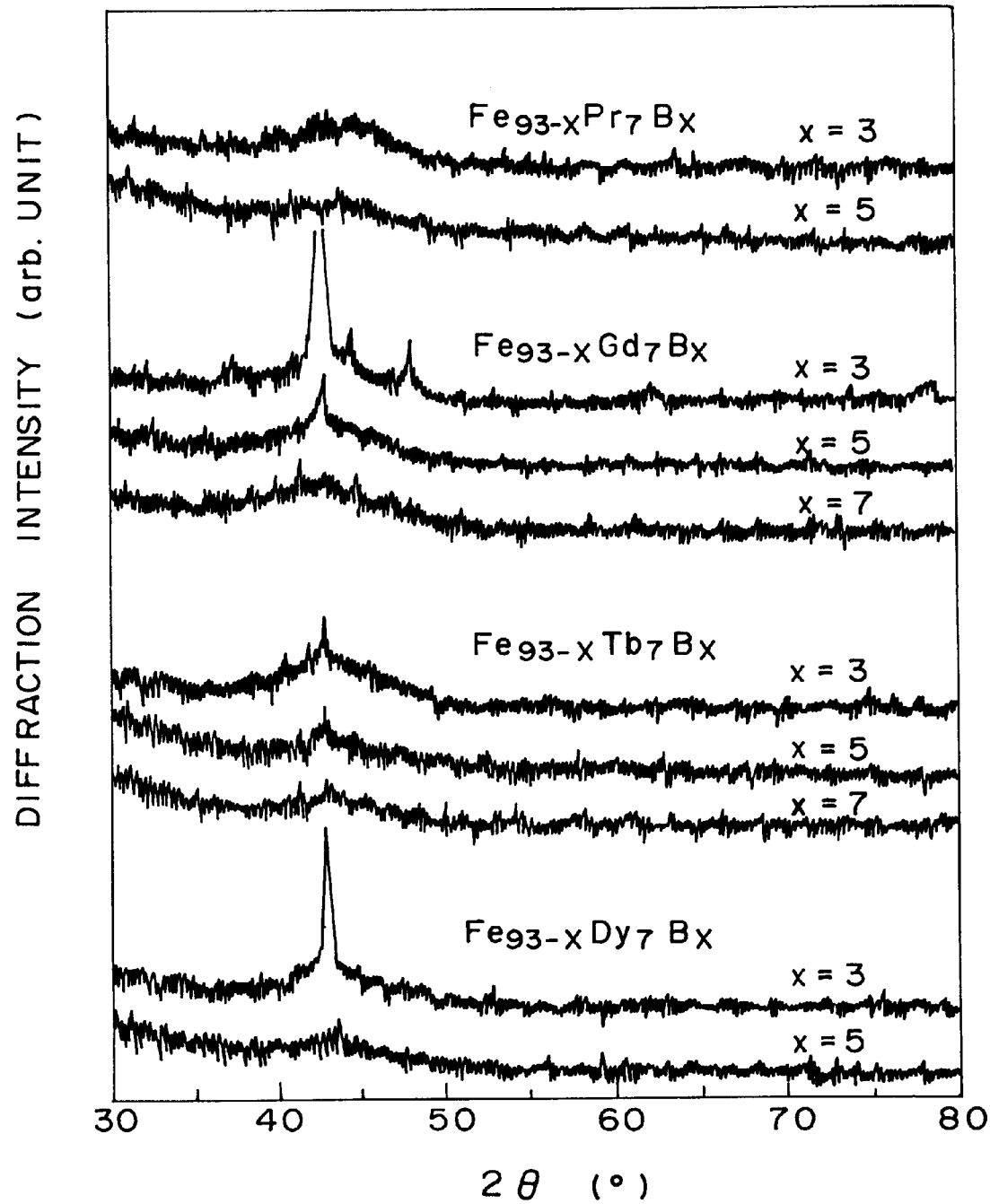
FIG. 2 is a diagram showing the results of X-ray diffraction of a comparative material immediately after quenching.

FIG. 2 shows the results of X-ray diffraction of thin strip samples as comparative examples each having a composition without element M (Zr, Nb, Ta or Hf), i.e., Fe—R—B (R is Pr, Gd, Tb or Dy), immediately after quenching. As shown in this diagram, in the cases without element M, even if the content of rare earth element R is 7 at %, when R is Gd, Tb or Dy, a diffraction peak which is possibly due to $Fe_3B$ is observed at the B content of 3 at % or 5 at %. This proves the formation of a crystalline phase. Although not shown in the diagram, it is recognized that the crystalline phase is formed in thin strip samples of $Fe_{91}Pr_6B_3$ and $Fe_{91}Nd_6B_3$ immediately after quenching.

The results shown in FIGS. 1 and 2 prove that, even if the content of the rare earth element is low, the amorphous phase can be obtained in the hard magnetic materials of the present invention by adding element M (Zr, Nb, Ta or Hf) for forming the amorphous phase thereto.

Figure 3:
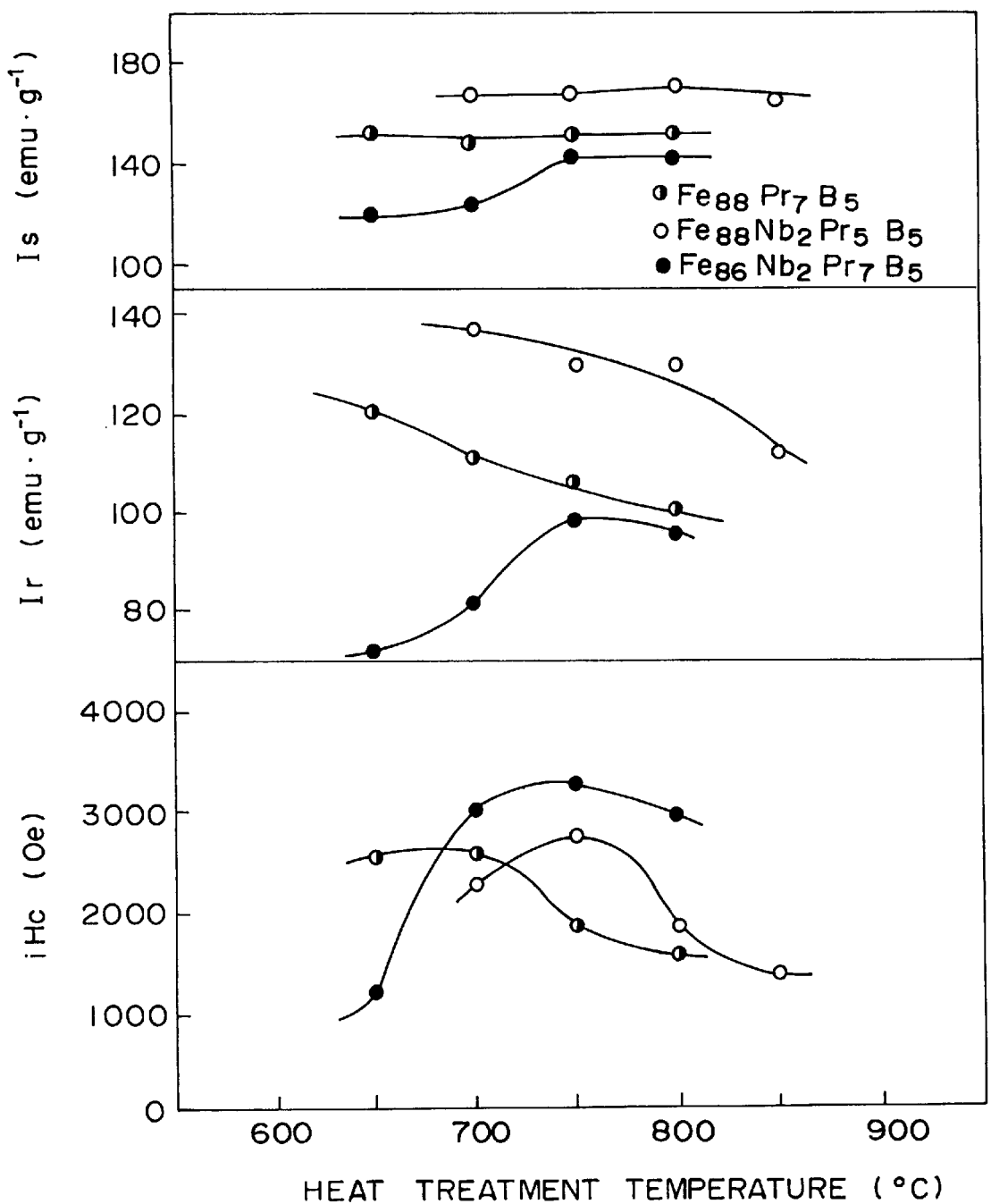
FIG. 3 is a graph showing the results of examination of hard magnetic materials of the present invention and comparative materials after heat treatment with respect to the dependence of saturation magnetization, remanent magnetization and coercive force on the heat treatment temperature.

FIG. 3 shows the results of examination of thin strip samples of $Fe_{86}Nbr_2Pr_7B_5$ and $Fe_{88}Nb_2Pr_5B_5$ within the composition range of the present invention and $Fe_{88}Pr_7B_5$ as a comparative example, after heat treatment, with respect to the dependence of saturation magnetization (Is), remanence magnetization (Ir) and coercive force (iHc) on the heat treatment temperature.

The results indicate that, in the thin strip samples of examples, higher coercive force (iHc) than that of the comparative rare earth magnet is obtained after heat treatment at an appropriate temperature within the range of 600 to 900° C., preferably 650 to 850° C., and more preferably 700 to 850° C. It is also recognized that the temperature showing the maximum coercive force (iHc) is higher than that of the comparative example.

It is also proved that the maximum coercive force (iHc) of the sample ($Fe_{86}Nb_2Pr_7B_5$), which was obtained by adding Nb to the comparative example ($Fe_{88}Pr_7B_5$) by substituting Fe with Nb, is significantly increased, and that saturation magnetization (Is) and remanent magnetization of the sample ($Fe_{88}Nb_2Pr_5B_5$), which was obtained by adding Nb to the comparative example ($Fe_{88}Pr_7B_5$) by substituting Pr with Nb, are increased.

Figure 4:
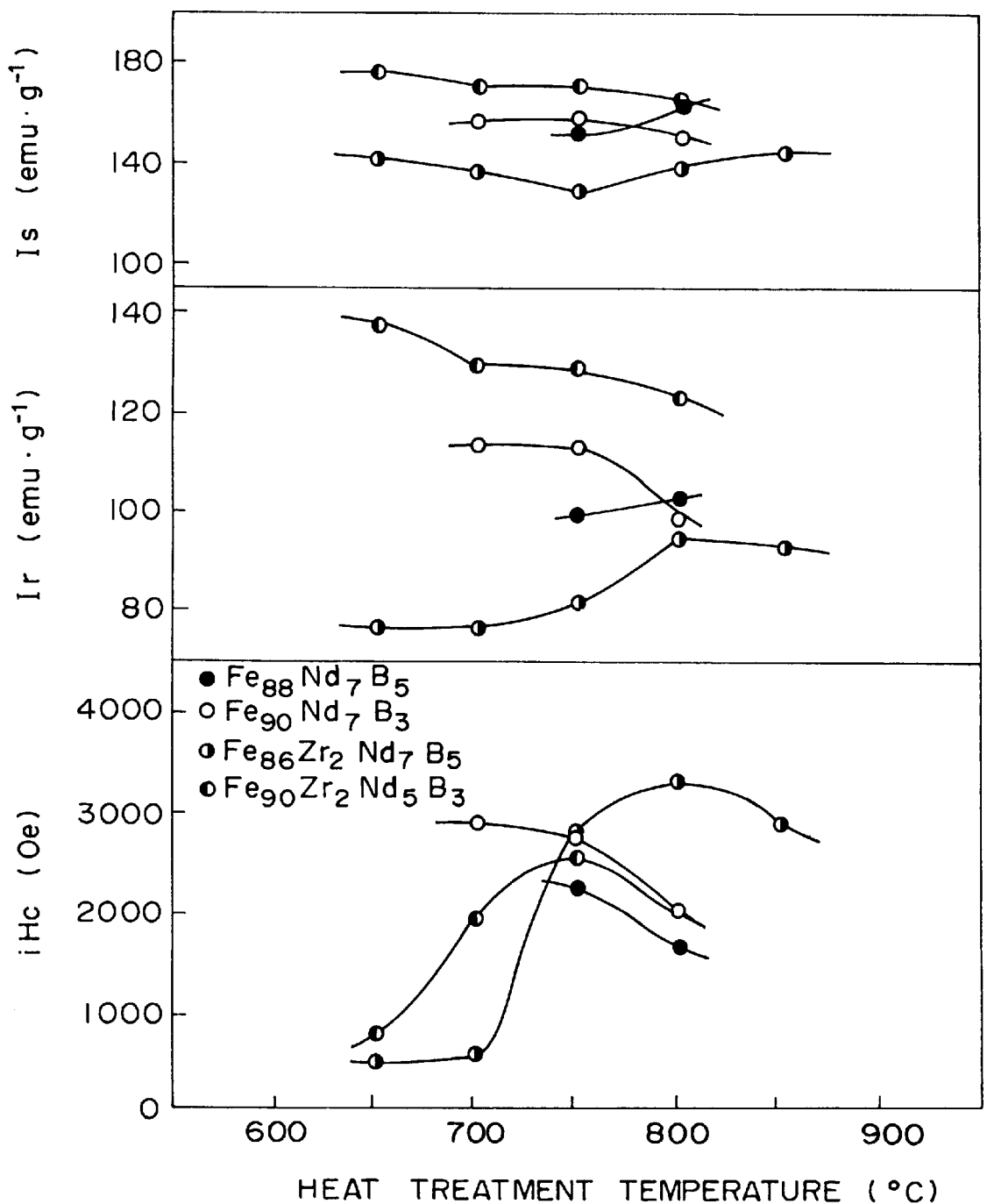
FIG. 4 is a graph showing the results of examination of hard magnetic materials of the present invention and comparative materials after heat treatment with respect to the dependence of saturation magnetization, remanent magnetization and coercive force on the heat treatment temperature.

FIG. 4 shows the results of examination of thin strip samples of $Fe_{86}Zr_2Nd_7B_5$ and $Fe_{90}Zr_2Nd_5B_3$ within the composition range of the present invention and $Fe_{88}Nd_7B_5$ and $Fe_{90}Nd_7B_3$ as comparative examples, after heat treatment, with respect to the dependence of saturation magnetization (Is), remanent magnetization (Ir) and coercive force (iHc) on the heat treatment temperature.

Like FIG. 3, it is recognized that the samples of the present invention show higher temperatures showing maximum coercive force (iHc) than the comparative examples.

It is also recognized that the maximum coercive force (iHc) of the sample ($Fe_{86}Zr_2Nd_7B_5$), which was obtained by adding Zr to the comparative example ($Fe_{88}Nd_7B_5$) by substituting Fe with Zr, is increased, and that saturation magnetization (Is) and remanent magnetization of the sample ($Fe_{90}Zr_2Nd_5B_3$), which was obtained by adding Zr to the comparative example ($Fe_{88}Nd_7B_5$) by substituting Nd by Zr, are increased.

The results shown in FIGS. 3 and 4 indicate that since the temperatures showing the maximum coercive force (iHc) of the hard magnetic materials of the present invention are on the higher temperature side, even if the materials are exposed to as a high temperature as 900° C., the materials have high magnetic characteristics. It is thus recognized that the hard magnetic materials of the present invention have higher thermal stability than that of conventional Fe—R—B-type hard magnetic materials.

FIGS. 5 to 10 show the results of examination of thin strip samples having the composition $Fe_{98-z-w}M_2R_zB_w$ (z=5 or 7, w=3 or 5) within the range of the present invention with respect to the dependence of saturation magnetization (Is), remanent magnetization (Ir) and coercive force (iHc) on the heat treatment temperature.

Figure 5:
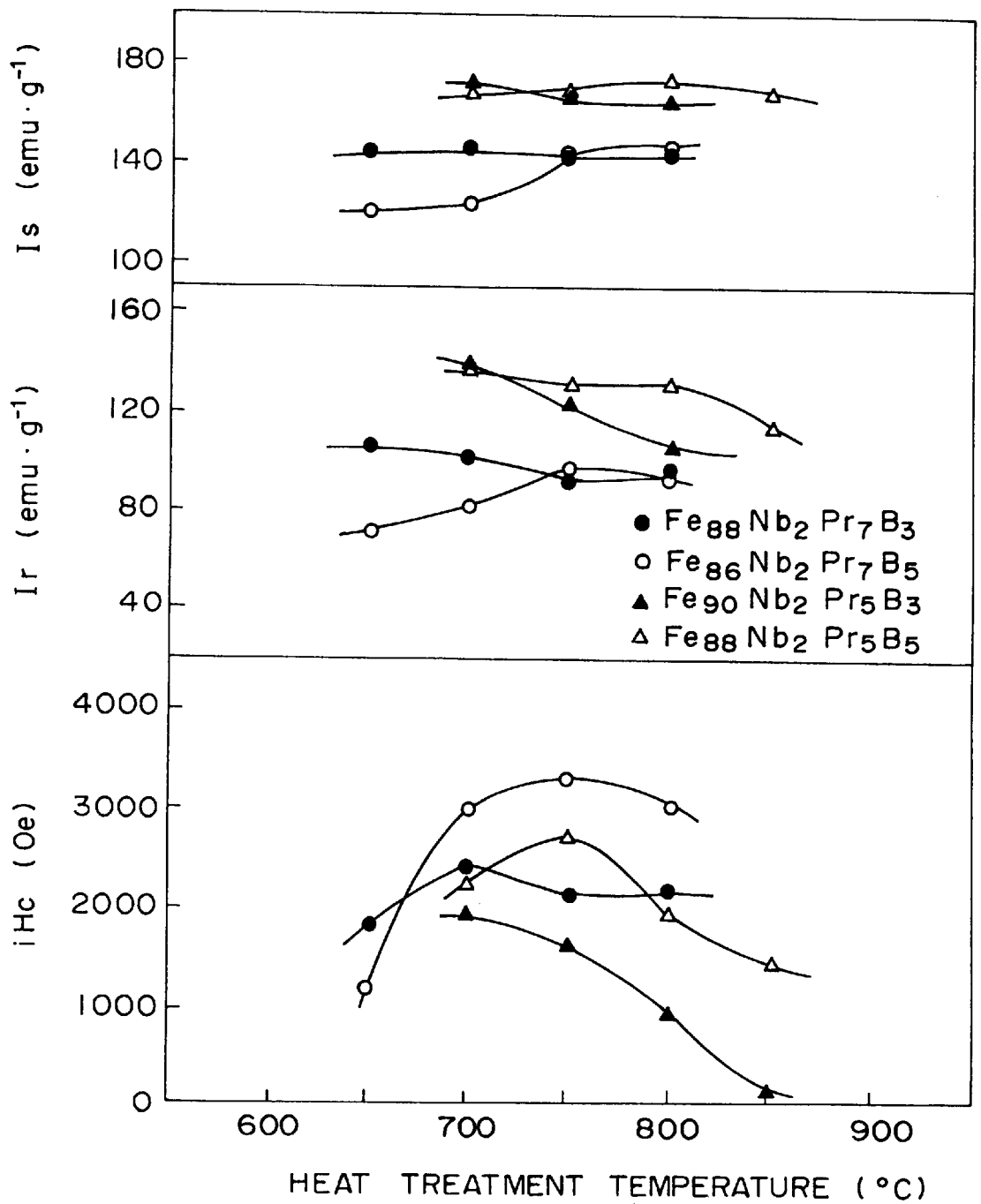
FIG. 5 is a graph showing the results of examination of hard magnetic materials of the present invention after heat treatment with respect to the dependence of saturation magnetization, remanent magnetization and coercive force on the heat treatment temperature.
Figure 6:
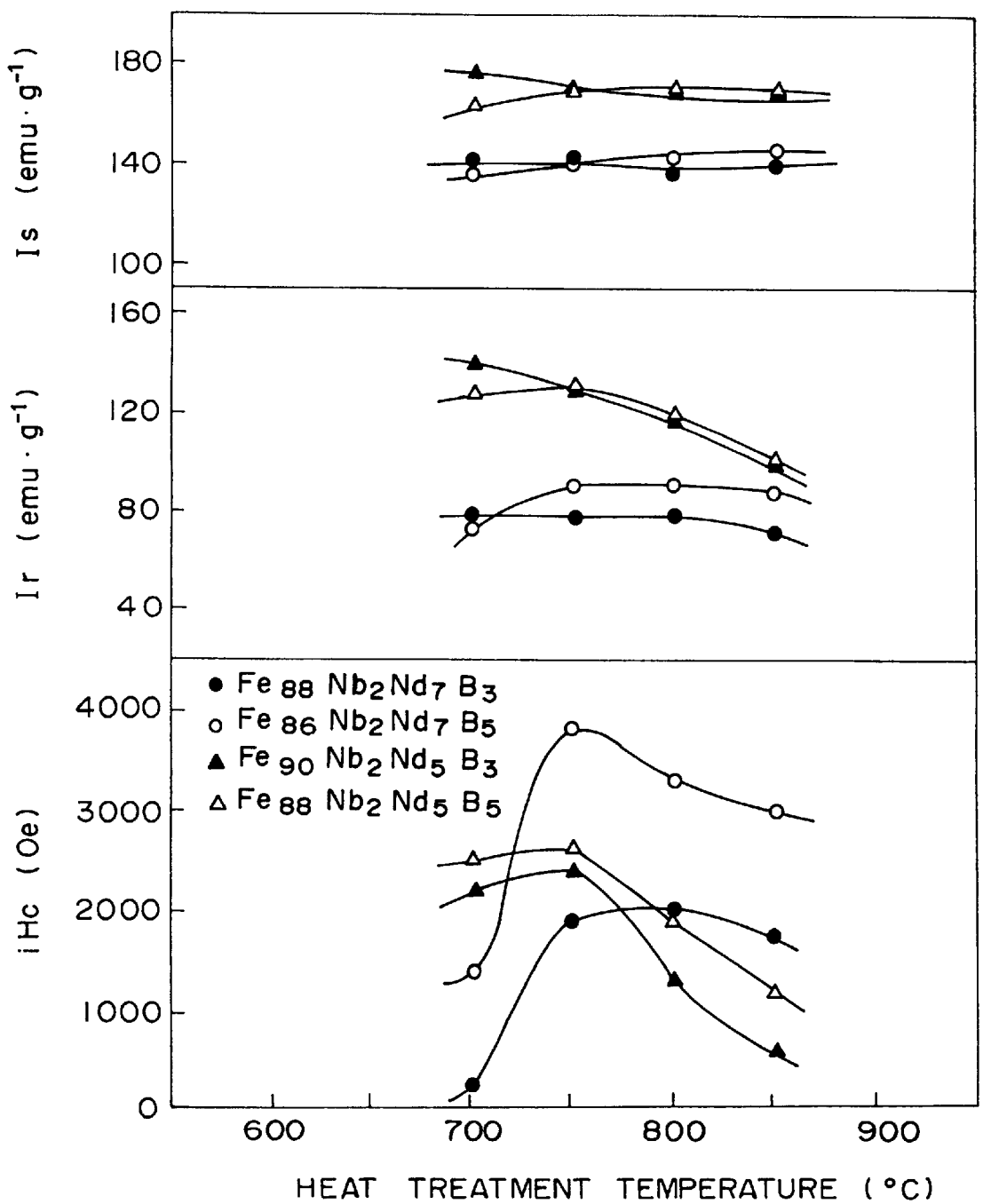
FIG. 6 is a graph showing the results of examination of hard magnetic materials of the present invention after heat treatment with respect to the dependence of saturation magnetization, remanent magnetization and coercive force on the heat treatment temperature.
Figure 7:
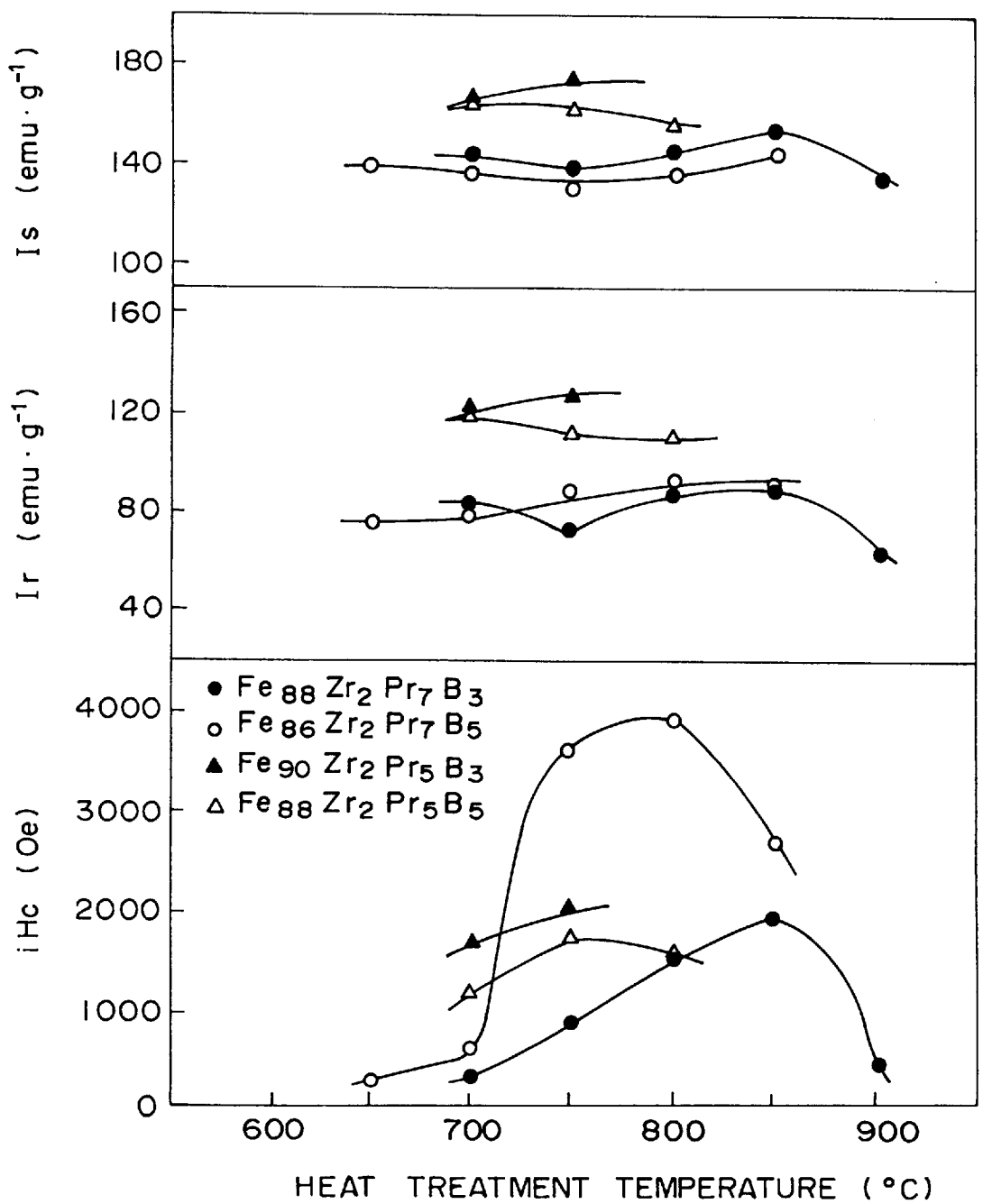
FIG. 7 is a graph showing the results of examination of hard magnetic materials of the present invention after heat treatment with respect to the dependence of saturation magnetization, remanent magnetization and coercive force on the heat treatment temperature.
Figure 8:
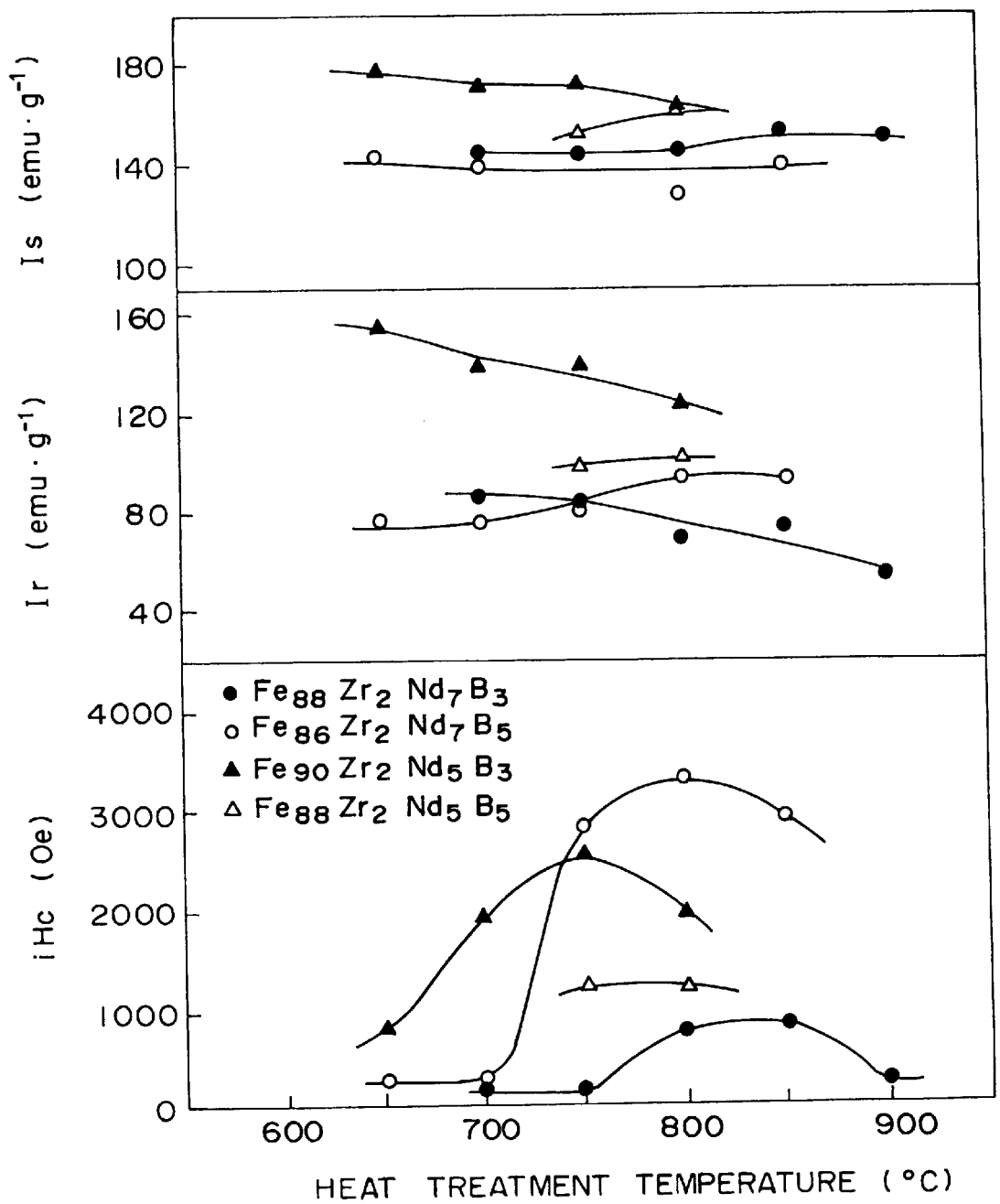
FIG. 8 is a graph showing the results of examination of hard magnetic materials of the present invention after heat treatment with respect to the dependence of saturation magnetization, remanent magnetization and coercive force on the heat treatment temperature.
Figure 9:
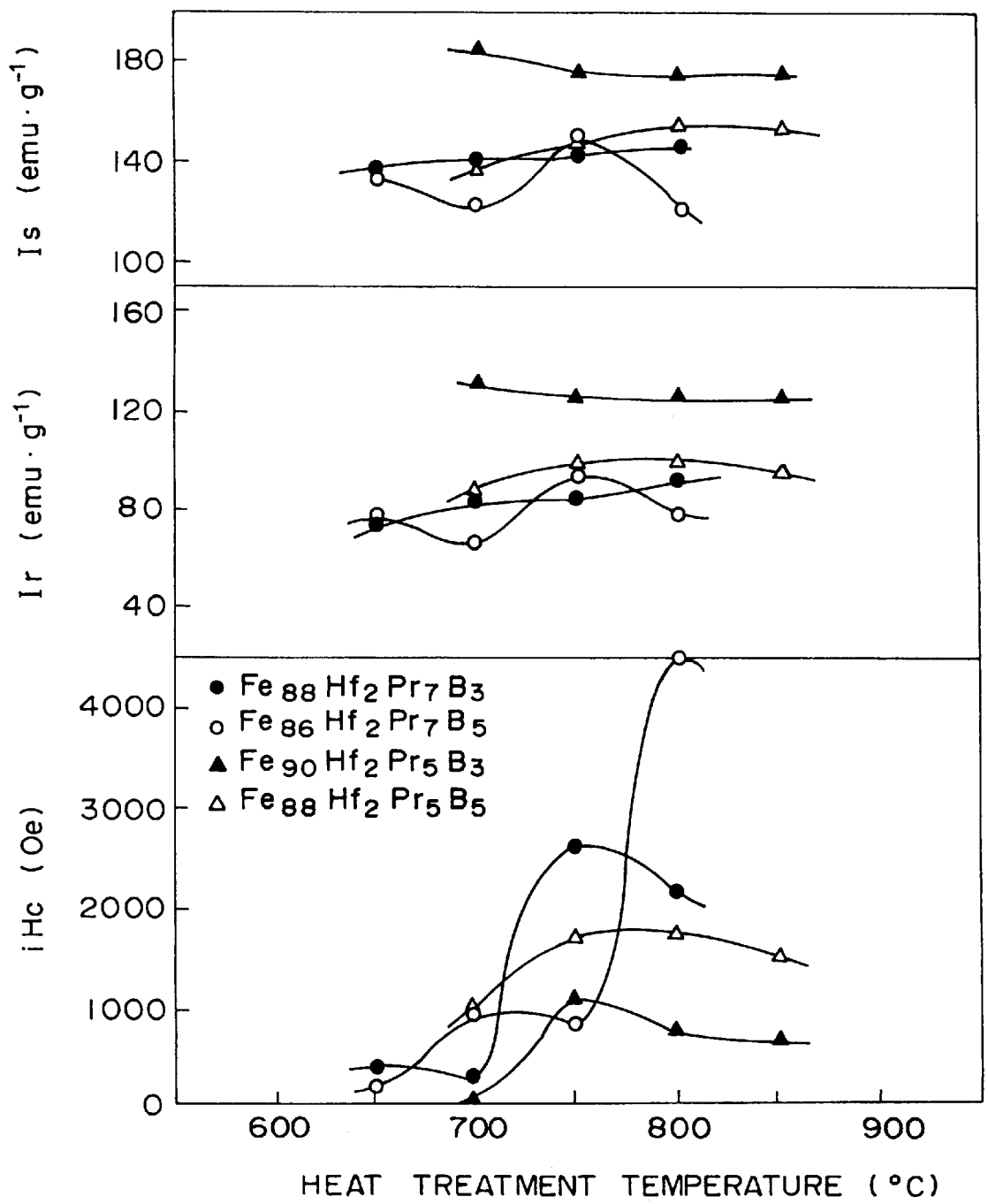
FIG. 9 is a graph showing the results of examination of hard magnetic materials of the present invention after heat treatment with respect to the dependence of saturation magnetization, remanent magnetization and coercive force on the heat treatment temperature.
Figure 10:
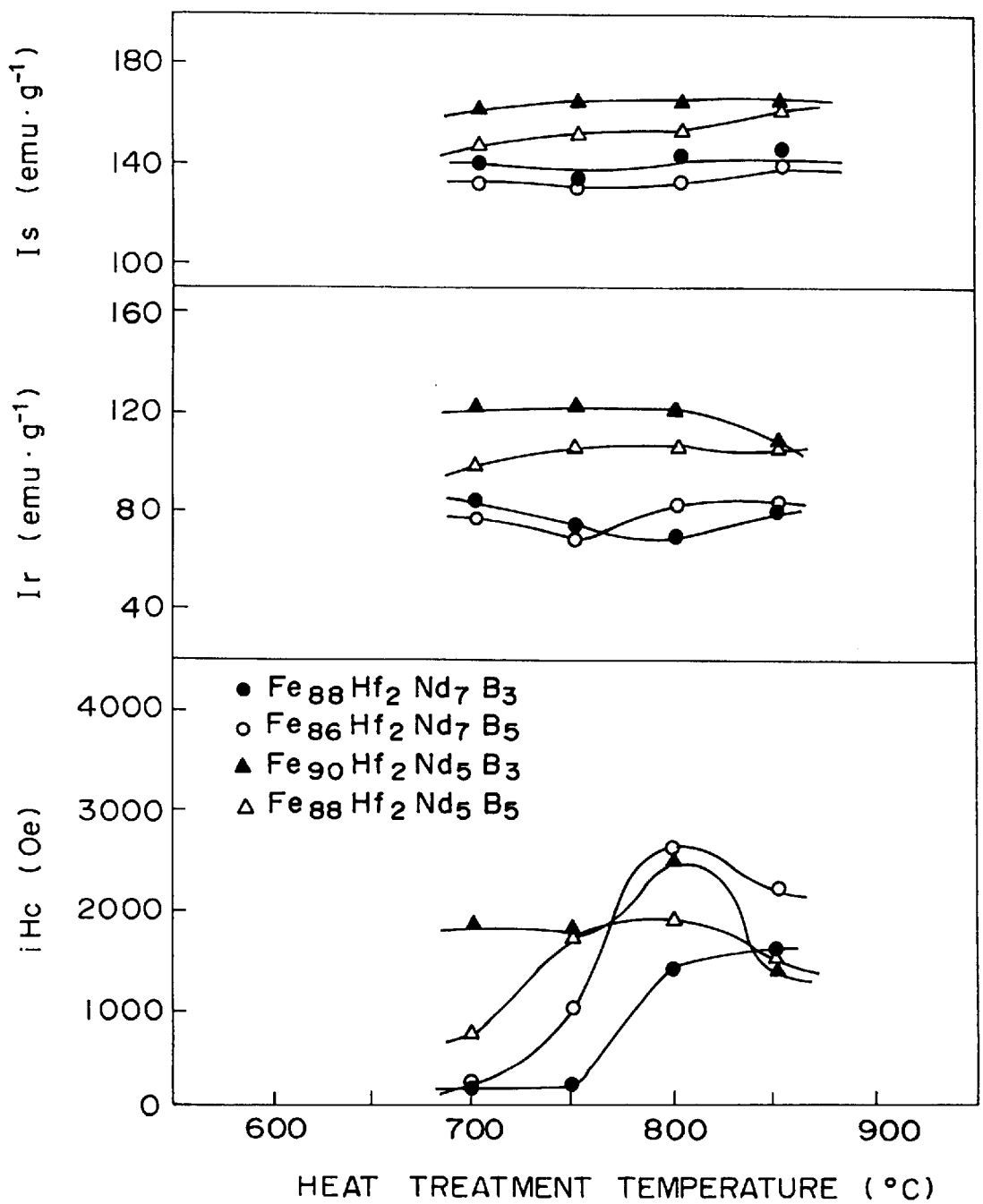
FIG. 10 is a graph showing the results of examination of hard magnetic materials of the present invention after heat treatment with respect to the dependence of saturation magnetization, remanent magnetization and coercive force on the heat treatment temperature.

FIG. 5 shows the case where M=Nb and R=Pr, FIG. 6 shows the case where M=Nb and R=Nd, FIG. 7 shows the case where M=Zr and R=Pr, FIG. 8 shows the case where M=Zr and R=Nd, FIG. 9 shows the case where M=Hf and R=Pr. and FIG. 10 shows the case where M=Hf and R=Nd.

The results indicate that, with any one of the compositions, the coercive force (iHc) is increased by performing heat treatment at an appropriate temperature, and the coercive force iHc of some sample is increased to 3000 Oe or more.

It is also recognized that the saturation magnetization (Is) changes little with the heat treatment temperature, and that, particularly, in a sample with a high Fe content or a low R (Nd or Pr) content, relatively high saturation magnetization (Is) is obtained. It is further recognized that a material having high saturation magnetization (Is) has high remanent magnetization (Ir), and a relatively high remanence ratio (Ir/Is), and that a high remanence ratio of at least 0.7 or 0.8, and high remanent magnetization of 120 emu/g or more are obtained by appropriately setting the composition.

Figure 11:
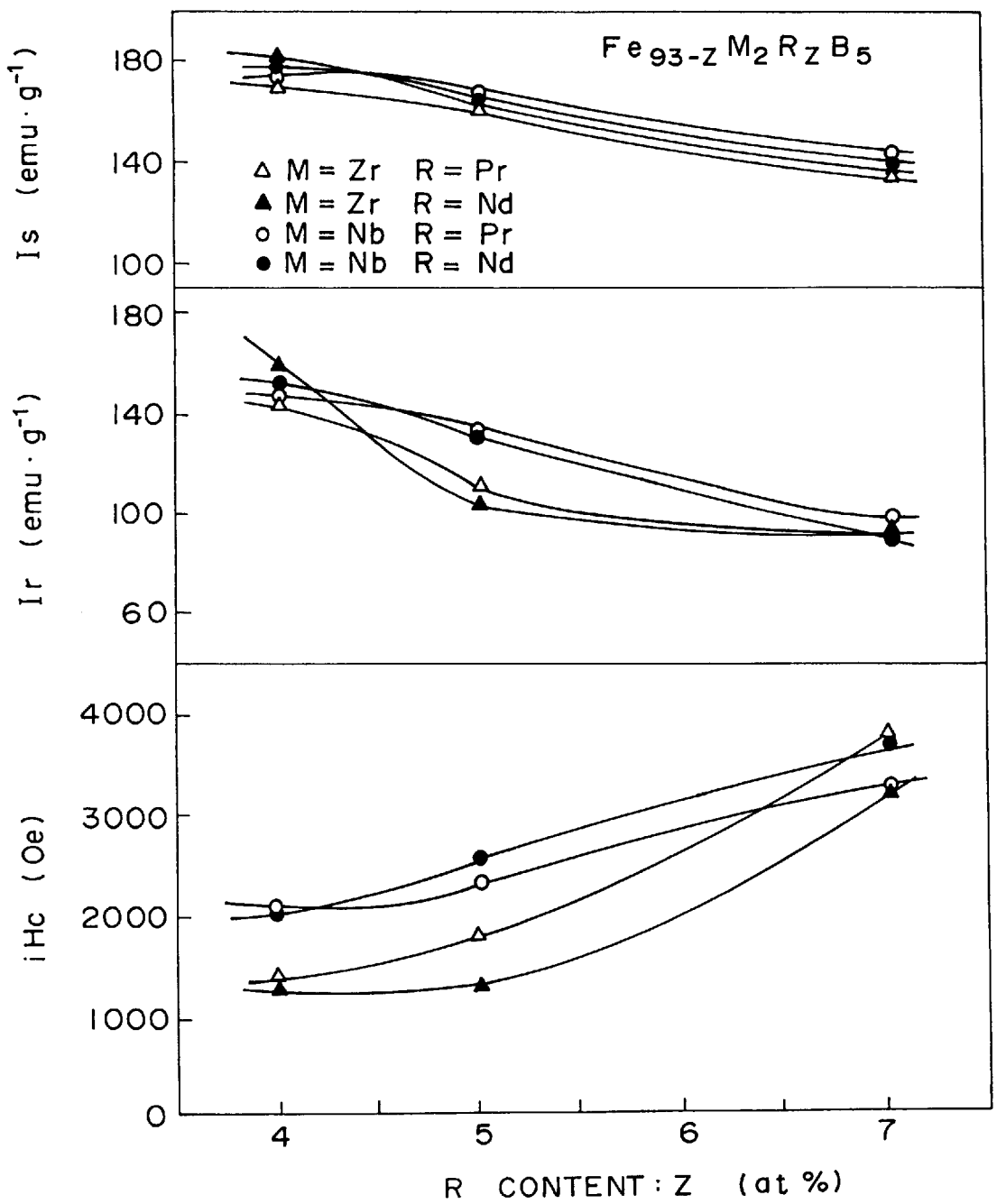
FIG. 11 is a graph showing the results of examination of hard magnetic materials of the present invention after heat treatment with respect to the dependence of saturation magnetization, remanent magnetization and coercive force on R content (z)

FIG. 11 shows the results of examination of the R content (z) dependencies of saturation magnetization (Is), remanent magnetization (Ir) and coercive force (iHc) of thin strip samples of $Fe_{93-z}M_2R_zB_5$ within the composition range of the present invention after heat treatment at an optimum temperature (750 to 800° C.).

It is proved by the results that as the R content (z) increases, and the Fe content decreases, the saturation magnetization (Is) decreases, and becomes 130 to 140 emu/g at z=7 at % (Fe=86 at %).

Although, in a composition with an R content (z) of as high as 7 at %, high coercive force (iHc) of 3000 Oe or more is obtained, and the coercive force (iHc) decreases as the R content (z) decreases. However, in a composition with a low R content (z), the saturation magnetization (is) and the remanent magnetization (Ir) tend to increase. Therefore, even in a composition with a low coercive force (iHc), a large maximum energy product (BH) max is obtained.

As shown in FIG. 11, the phenomenon that, in a composition with a low R content (z), the saturation magnetization (Is) and the remanent magnetization (Ir) tend to increase is due to not only the increase in saturation magnetization (Is) caused by a decrease in R content and an increase in Fe content, but also the high remanence ratio (Ir/Is) of this material of 0.7 or more.

In these examples, even in a composition with a low R content of 4 at %, high remanent magnetization of 140 emu/g or more is obtained.

Figure 12:
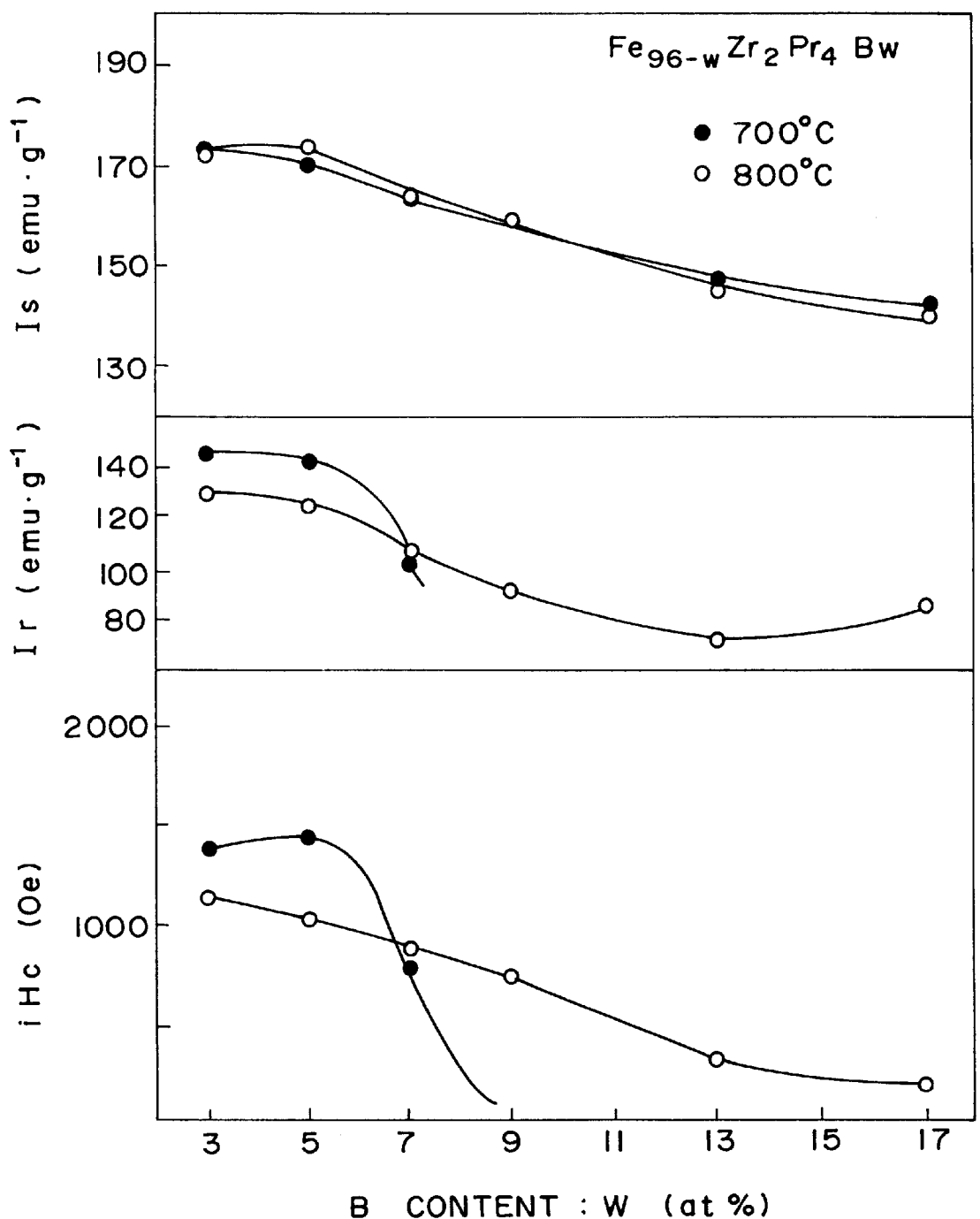
FIG. 12 is a graph showing the results of examination of hard magnetic materials of the present invention after heat treatment with respect to the dependence of saturation magnetization, remanent magnetization and coercive force on B content (w)

FIG. 12 shows the results of examination of B content (w) dependencies of saturation magnetization (Is), remanent magnetization (Ir) and coercive force (iHc) of thin strip samples of $Fe_{96-w}Zr_2Pr_4B_w$ within the composition range of the present invention after heat treatment at each of temperatures 700° C. and 800° C.

The results show the tendency that all saturation magnetization (Is), remanent magnetization (Ir) and coercive force (iHc) decrease with increases in the B content.

The B content is preferably about 7 at % or less in order to obtain good hard magnetic characteristics such as Ir of 100 emu/g or more and coercive force of about 1 kOe or more.

Figure 13:
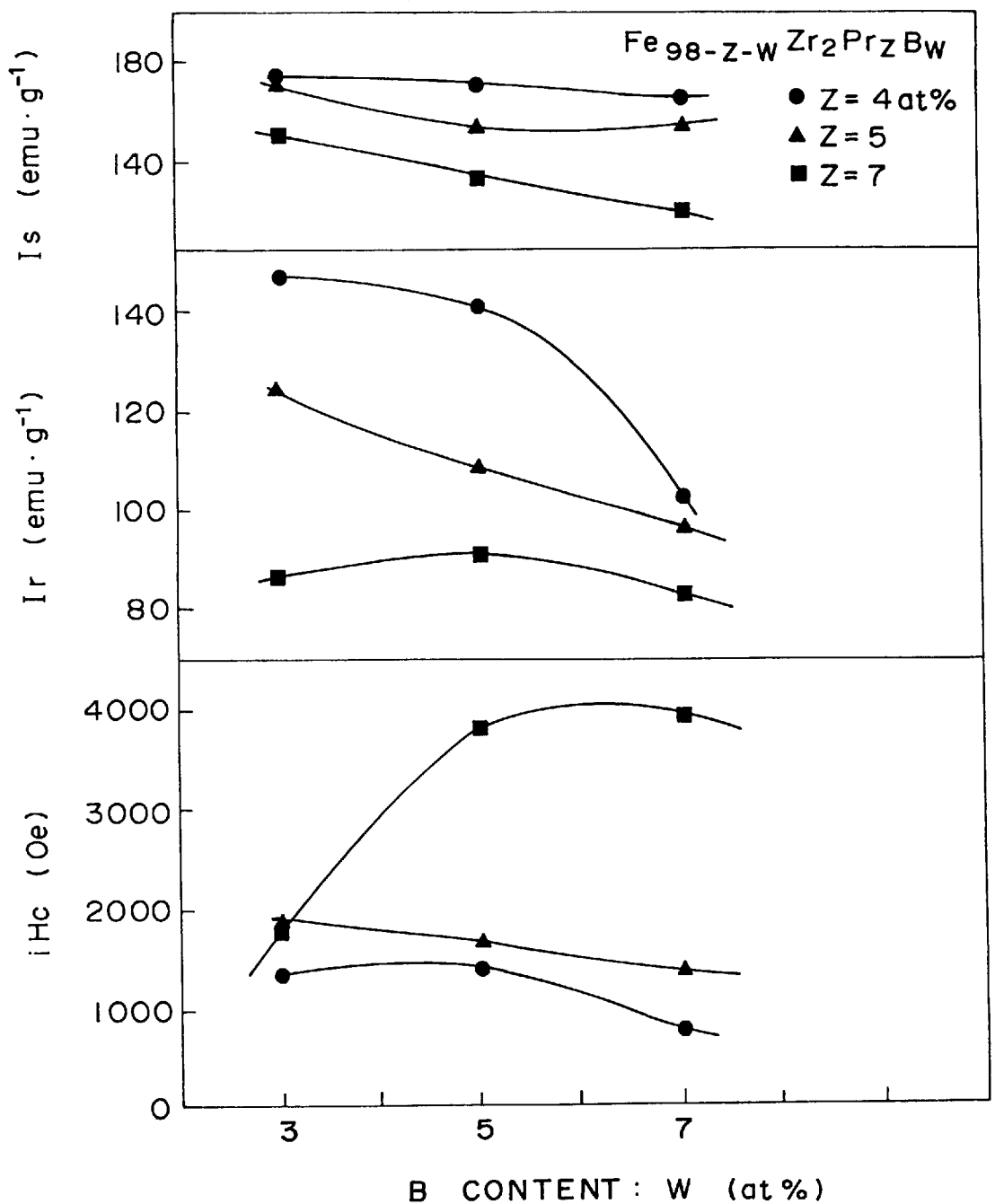
FIG. 13 is a graph showing the results of examination of hard magnetic materials of the present invention after heat treatment with respect to the dependence of saturation magnetization, remanent magnetization and coercive force on B content (w)

FIG. 13 shows the results of examination of thin strip samples of $Fe_{96-z-w}Zr_2Pr_zB_w$ (z=4, 5 or 7 at %) within the composition range of the present invention after heat treatment at an optimum temperature (750 to 800° C.) with respect to the dependence of saturation magnetization (Is), remanent magnetization (Ir) and coercive force (iHc) on B content (w).

The results show that, in a sample with a high Pr content (z) of 7 at % and a high B content (w), high coercive force (iHc) is obtained, and, at the same time, the remanent magnetization (Ir) is significantly decreased. Namely, although high coercive force (iHc) can be obtained by increasing both the Pr content (z) and B content (w), the remanent magnetization (ir) is decreased, and thus the maximum energy product (BH)max is not much increased. It is thus recognized that, in a composition with relatively low Pr content (z) and B content (w), i.e., a composition with a high Fe content, excellent hard magnetic characteristics such as a maximum energy product of about 100 kJ/m³ or more is obtained.

Figure 14:
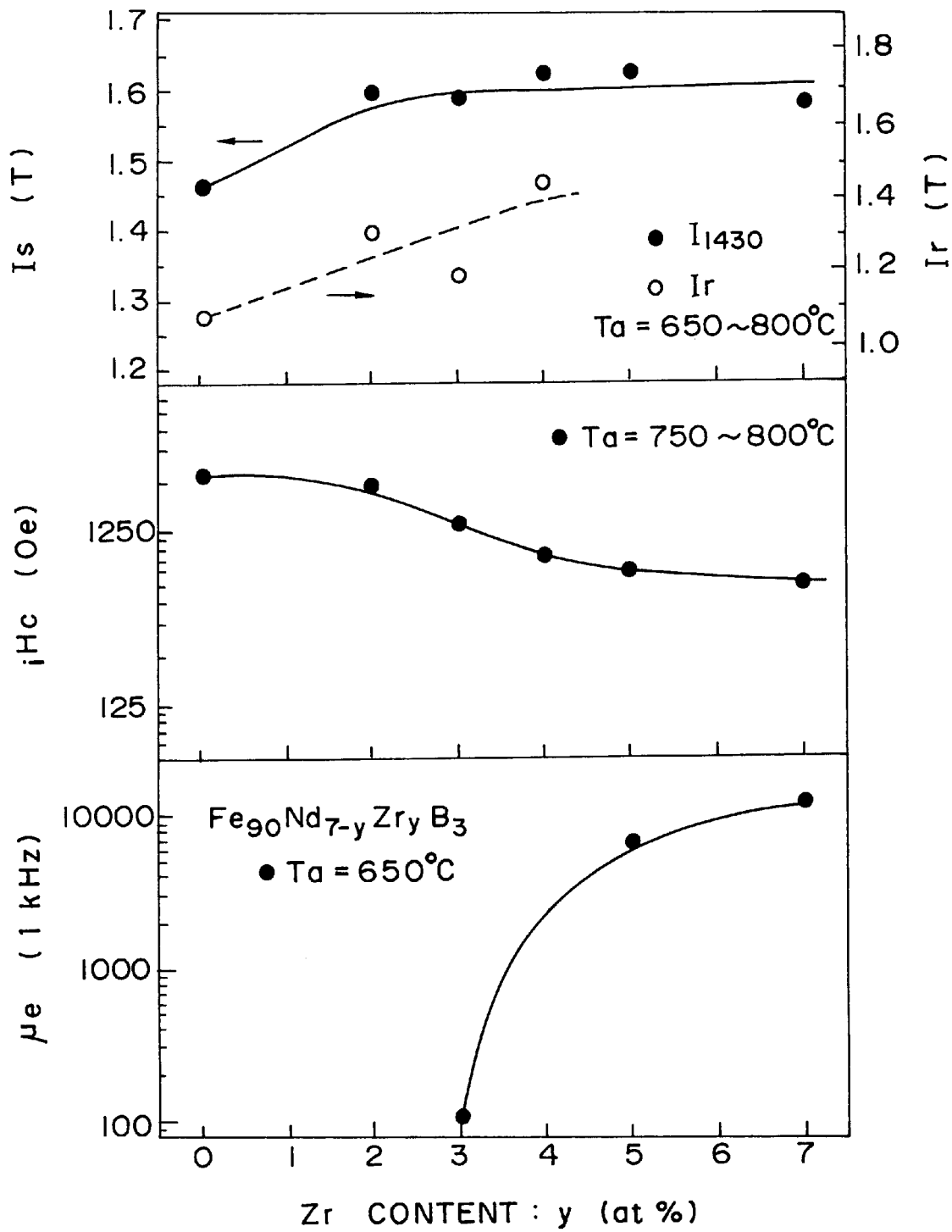
FIG. 14 is a graph showing the results of examination of hard magnetic materials of the present invention after heat treatment with respect to the dependence of saturation magnetization, remanent magnetization, coercive force and magnetic permeability on Zr content (y)

FIG. 14 shows the results of examination of thin strip samples of $Fe_{90}Zr_yNd_{7-y}B_3$ within the composition range of the present invention after heat treatment at a predetermined temperature with respect to the dependence of saturation magnetization (Is), remanent magnetization (Ir), coercive force (iHc) and magnetic permeability (Re, frequency 1 kHz) on Zr content (y).

It is recognized by the results that, although the saturation magnetization (Is) and remanent magnetization (Ir) increase as the Zr content (y) increases, at a Zr content (y) of 4 at % or more, the coercive force (iHc) decreases, and magnetic characteristics change from hard magnetic characteristics to soft magnetic characteristics. Since the magnetic permeability significantly increases at a Zr content (y) of 3 at % or more, the Zr content (y) is preferably 3 at % or less in order to obtain desirable hard magnetic characteristics.

Figure 15:
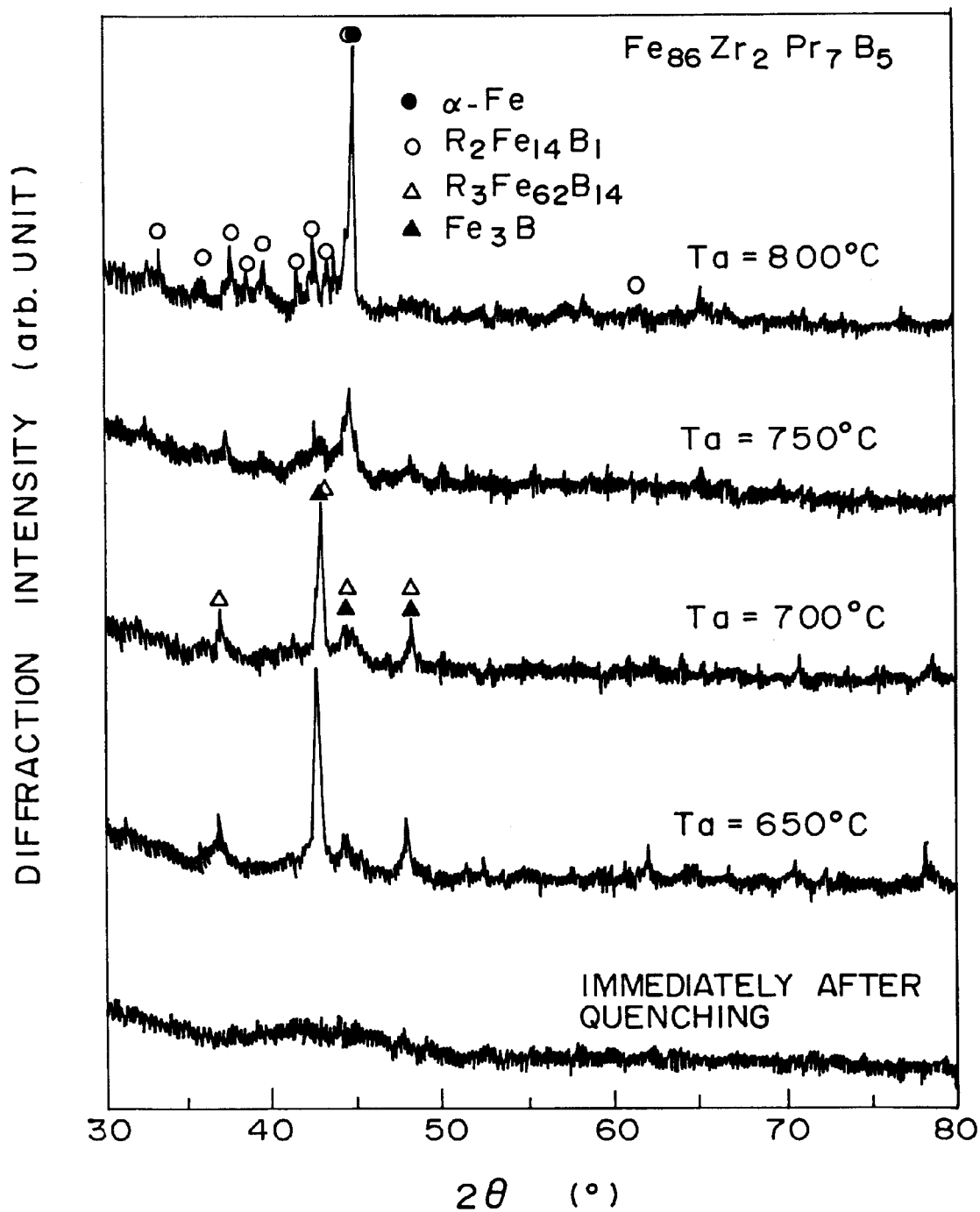
FIG. 15 is a diagram showing the results of X-ray diffraction of a hard magnetic material of the present invention immediately after quenching and after heat treatment.

FIG. 15 shows the results of X-ray diffraction of the thin strip samples of $Fe_{86}Zr_2Pr_7B_5$ within the composition range of the present invention immediately after quenching and after heat treatment at each of temperatures of 650° C., 700° C., 750° C. and 800° C.

This diagram shows no precipitation of compounds immediately after quenching, but shows a diffraction peak which is probably due to $Fe_3B$ after heat treatment at 650° C. or more, and diffraction peaks which are probably due to bcc-Fe and $R_2Fe_{14}B_1$ after heat treatment at 750° C. or more.

Figure 16:
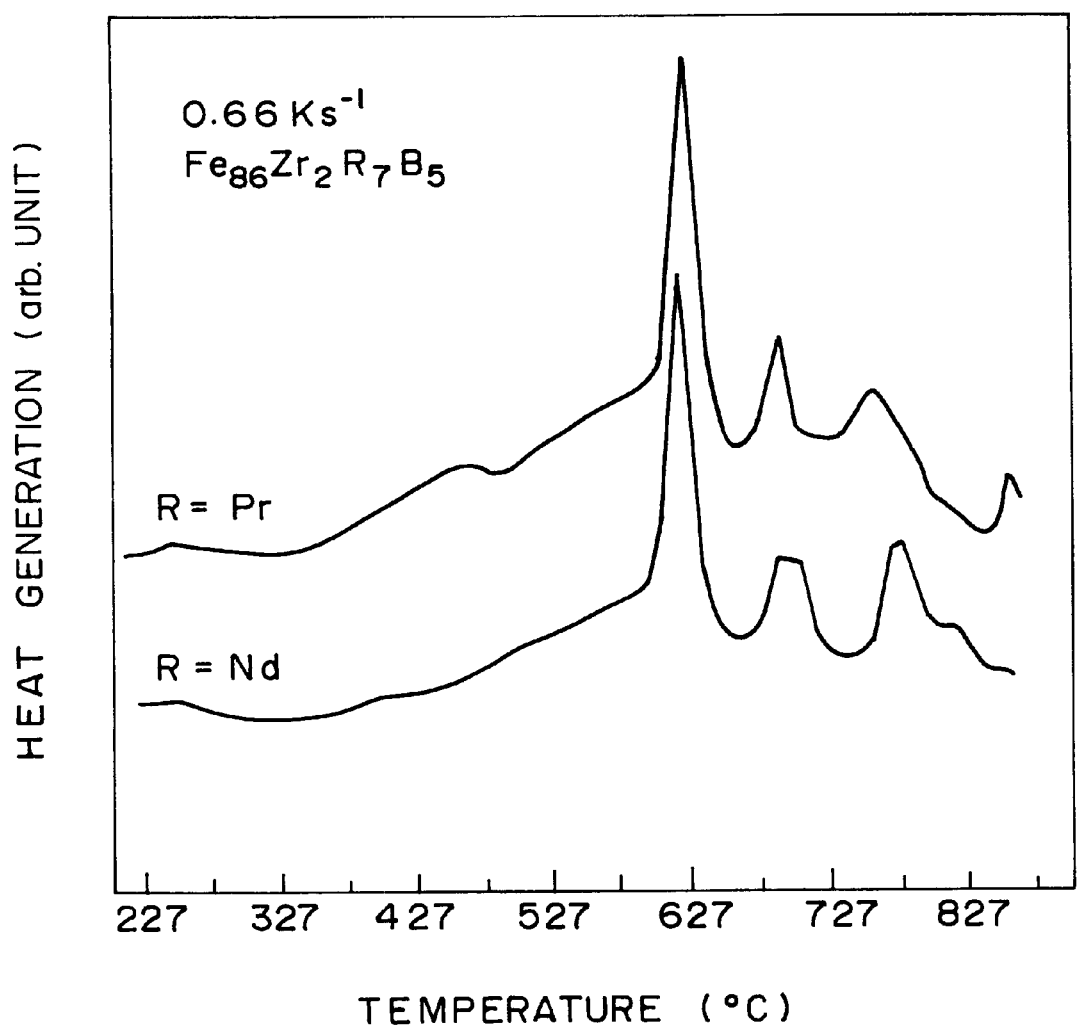
FIG. 16 is a diagram showing the DSC curves of hard magnetic materials of the present invention.

FIG. 16 shows DSC curves (measurements by Differential Scanning Caloriemeter: differential thermal analyzer) of amorphous alloy thin strips having the compositions of $Fe_{86}Zr_2Pr_7B_5$ and $Fe_{86}Zr_2Nd_7B_5$ at a rate of temperature rise of 10° C./min.

The DSC curves show peaks corresponding to three-step crystallization reaction. It is considered by correspondence between these peaks and the peaks shown in the X-ray diffraction graph of FIG. 15 that the first reaction peak observed at the lowest temperature corresponds to crystallization of $Fe_3B$, the second reaction peak corresponds to crystallization of bcc-Fe and the third reaction peak corresponds to crystallization of $R_2Fe_{14}B_1$.

It is thought from these results that these samples have a mixed texture comprising an amorphous phase, bcc-Fe or bcc-Fe compound, $Fe_3B$ and $R_2Fe_{14}B_1$ after heat treatment at 750 to 800° C which shows high coercive force in FIGS. 7 and 8.

Figure 17:
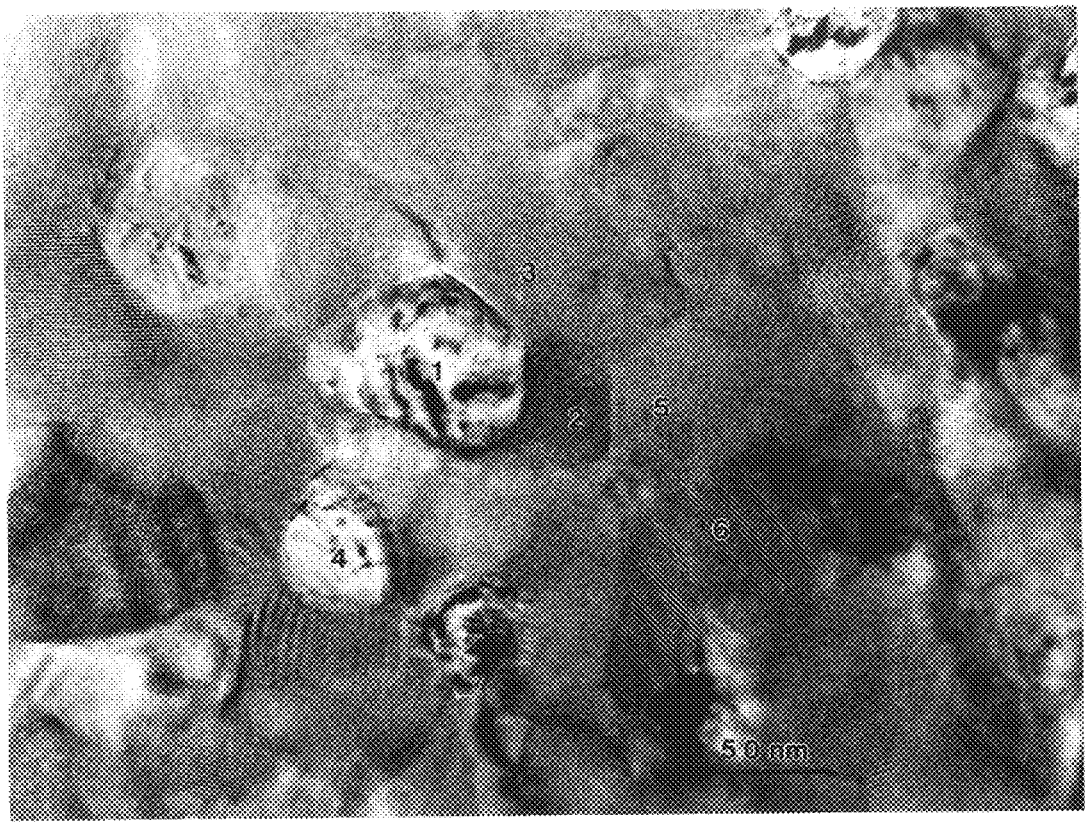
FIG. 17 is a transmission electron microscopic photograph showing the metallic texture of an example of hard magnetic materials of the present invention.
Figure 18:
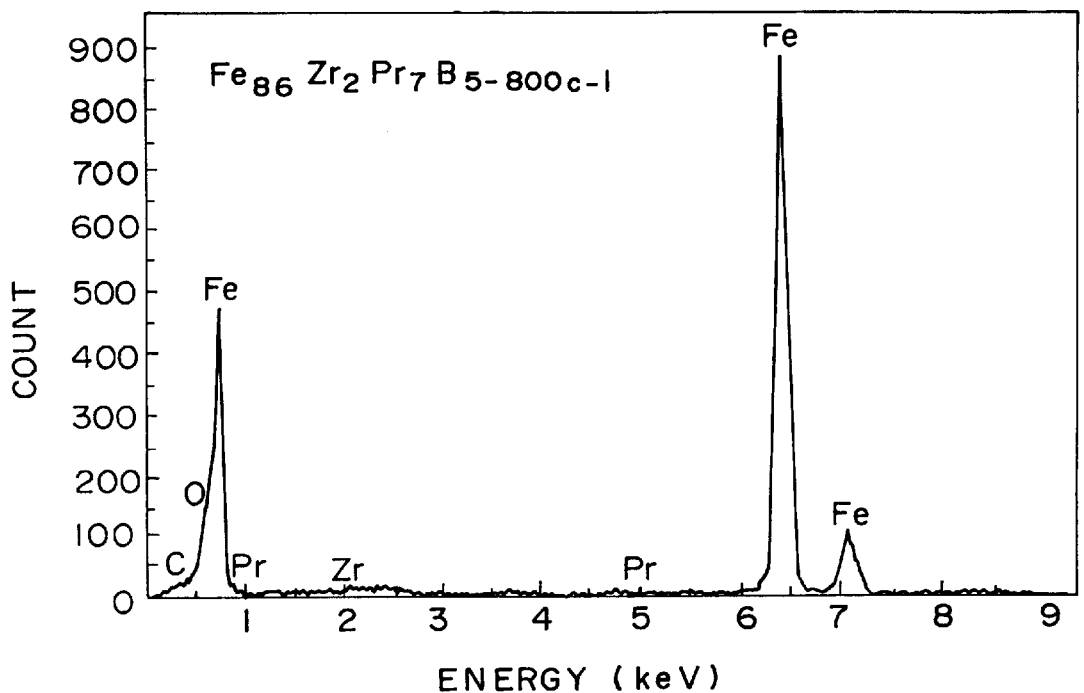
FIG. 18 is a diagram showing the results of nanobeam EDS analysis at point 1 shown in FIG. 17.
Figure 19:
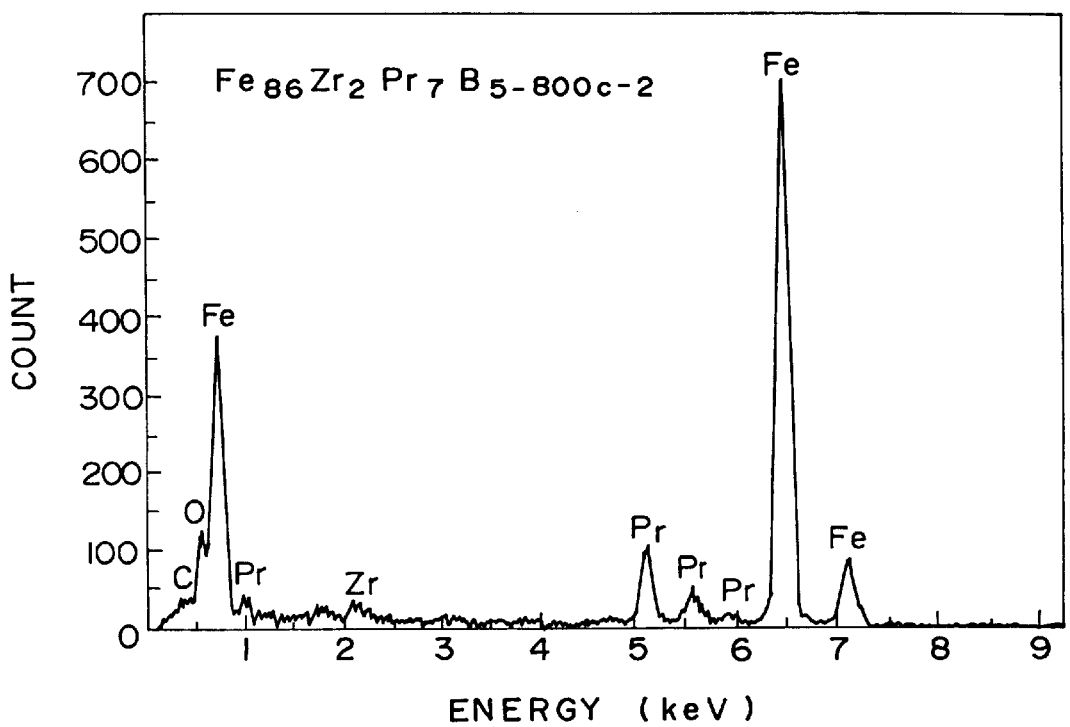
FIG. 19 is a diagram showing the results of nanobeam EDS analysis at point 2 shown in FIG. 17.
Figure 20:
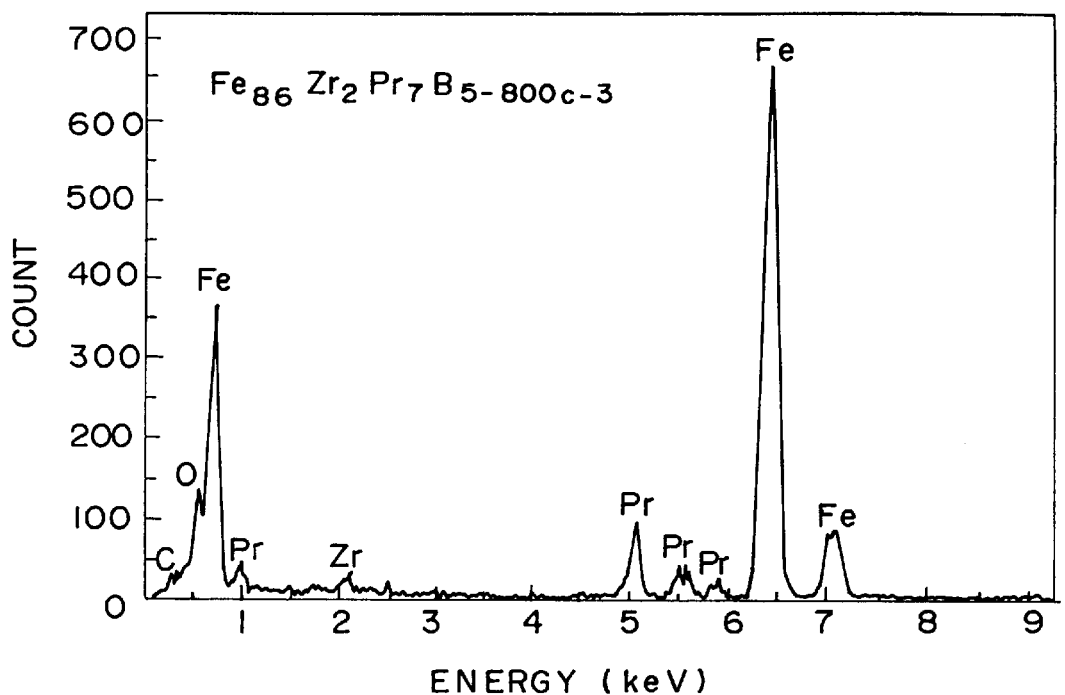
FIG. 20 is a diagram showing the results of nanobeam EDS analysis at point 3 shown in FIG. 17.
Figure 21:
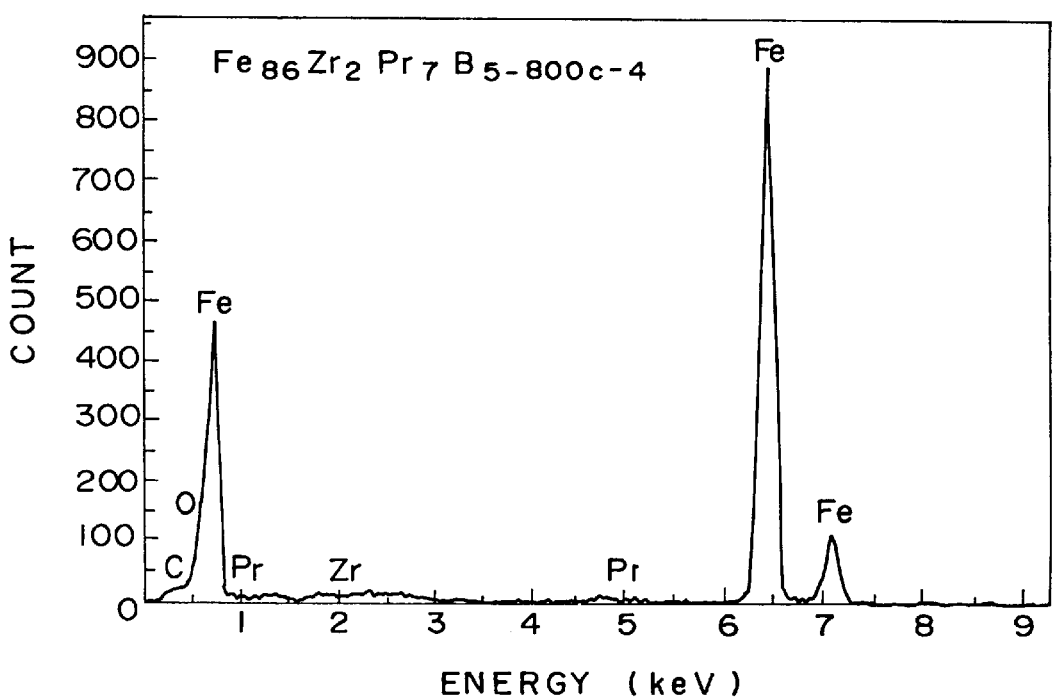
FIG. 21 is a diagram showing the results of nanobeam EDS analysis at point 4 shown in FIG. 17.
Figure 22:
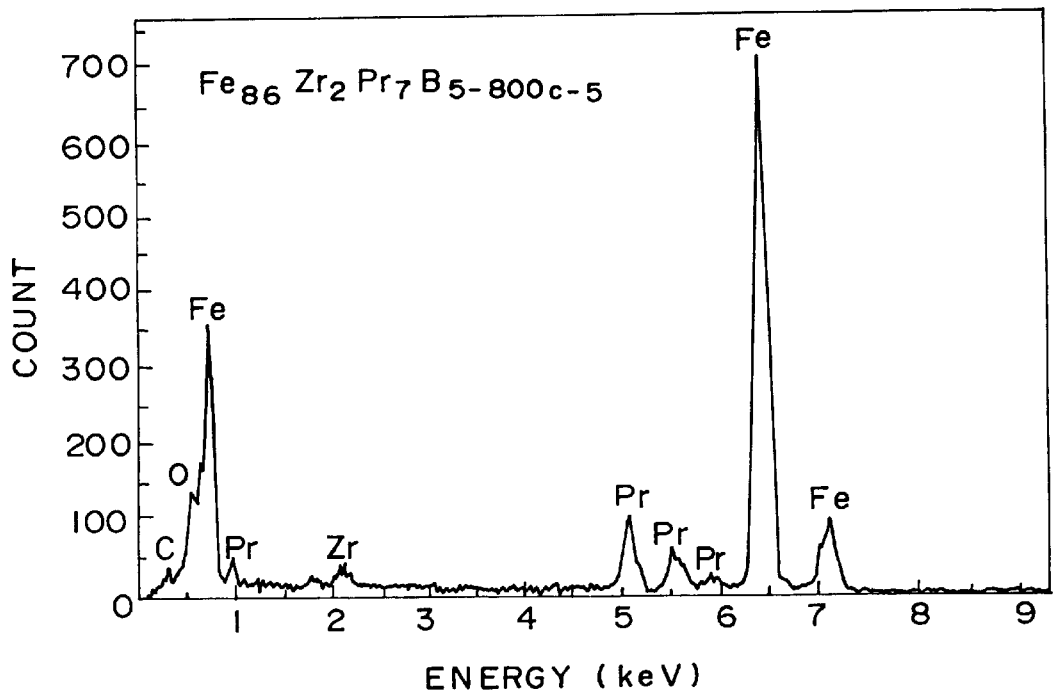
FIG. 22 is a diagram showing the results of nanobeam EDS analysis at point 5 shown in FIG. 17.
Figure 23:
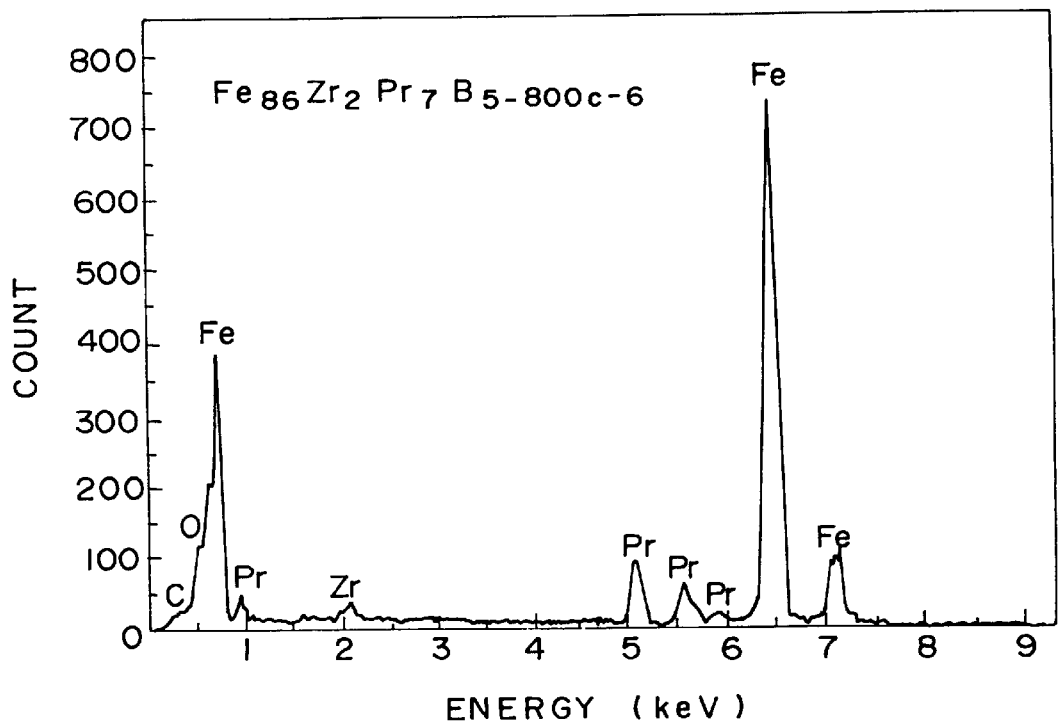
FIG. 23 is a diagram showing the results of nanobeam EDS analysis at point 6 shown in FIG. 17.

FIG. 17 is a transmission electron microscopic photograph showing the texture state of a $Fe_{86}Zr_2Pr_7B_5$ thin strip sample after heat treatment at 750° C. which shows high coercive force in FIG. 7.

In this photograph, many crystal grains of about 50 nm are observed.

FIGS. 18 to 23 respectively shows the results of EDS analysis (Energy Dispersive Spectroscopic Analysis) at points 1 to 6 in FIG. 17 using nanobeams. In these diagrams, in the $Fe_{86}Zr_2Pr_7B_5$ thin strip sample, a Fe-rich phase which probably comprises bcc-Fe or a bcc-Fe compound, and a Pr-rich phase probably comprising $R_2Fe_{14}B_1$ are observed.

FIGS. 25 to 28 are triangular composition diagrams showing Ir, iHc and (BH)max of Fe—(Nb, Zr)—(Pr, Nd)—B alloys. These diagrams indicate that high (BH)max value is obtained at a low Pr or Nd content of 4 to 5 at %.

Table 1 below shows the results of measurement of saturation magnetization (Is), residual magnetic flux density (Ir), coercive force (iHc) and maximum energy product ((BH)max) of thin strip samples of $Fe_aCO_bNb_2Pr_7B_5$ (a+b= 86, 0 ≦b≦50) with varying Fe—Co composition ratios after heat treatment at an optimum temperature (750 to 800° C.).

TABLE 1

|  | Is(T) | Ir(T) | iHc(Oe) | (BH)max)kJ/m³) |
|---|---|---|---|---|
| $Fe_{86}Nb_2Pr_7B_5$ | 1.34 | 0.93 | 3390 | 53.93 |
| $Fe_{84}CO_2Nb_2Pr_7B_5$ | 1.44 | 1.03 | 2890 | 58.75 |
| $Fe_{82}CO_4Nb_2Pr_7B_5$ | 1.46 | 1.08 | 2900 | 67.50 |
| $Fe_{76}CO_{10}Nb_2Pr_7B_5$ | 1.39 | 1.04 | 3470 | 78.75 |
| $Fe_{66}CO_{20}Nb_2Pr_7B_5$ | 1.47 | 1.13 | 3310 | 95.00 |
| $Fe_{56}CO_{30}Nb_2Pr_7B_5$ | 1.58 | 1.16 | 2900 | 75.50 |
| $Fe_{46}CO_{40}Nb_2Pr_7B_5$ | 1.45 | 1.01 | 2750 | 68.75 |
| $Fe_{36}CO_{50}Nb_2Pr_7B_5$ | 1.46 | 0.95 | 2000 | 49.75 |

As shown in the table, although $Fe_{86}Nb_2Pr_7B_5$ without Co has high coercive force (iHc) of 3000 Oe or more, the saturation magnetic flux density (Is) and residual magnetic flux density (Ir) are relatively low. In contrast with this, saturation magnetic flux density (Is) and residual magnetic flux density (Ir) are increased by adding Co by substituting Fe with Co. There is also the tendency that the coercive force (iHc) is decreased by adding Co. However, in $Fe_{66}CO_{20}Nb_2Pr_7B_5$ with a Co content of 20 at %, high coercive force (iHc) of 3000 Oe or more and high residual magnetic flux density (ir) of 1.16 T are simultaneously obtained, and a high maximum energy product ((BH)max) of 95 kJ/cm³ is exhibited.

Figure 24:
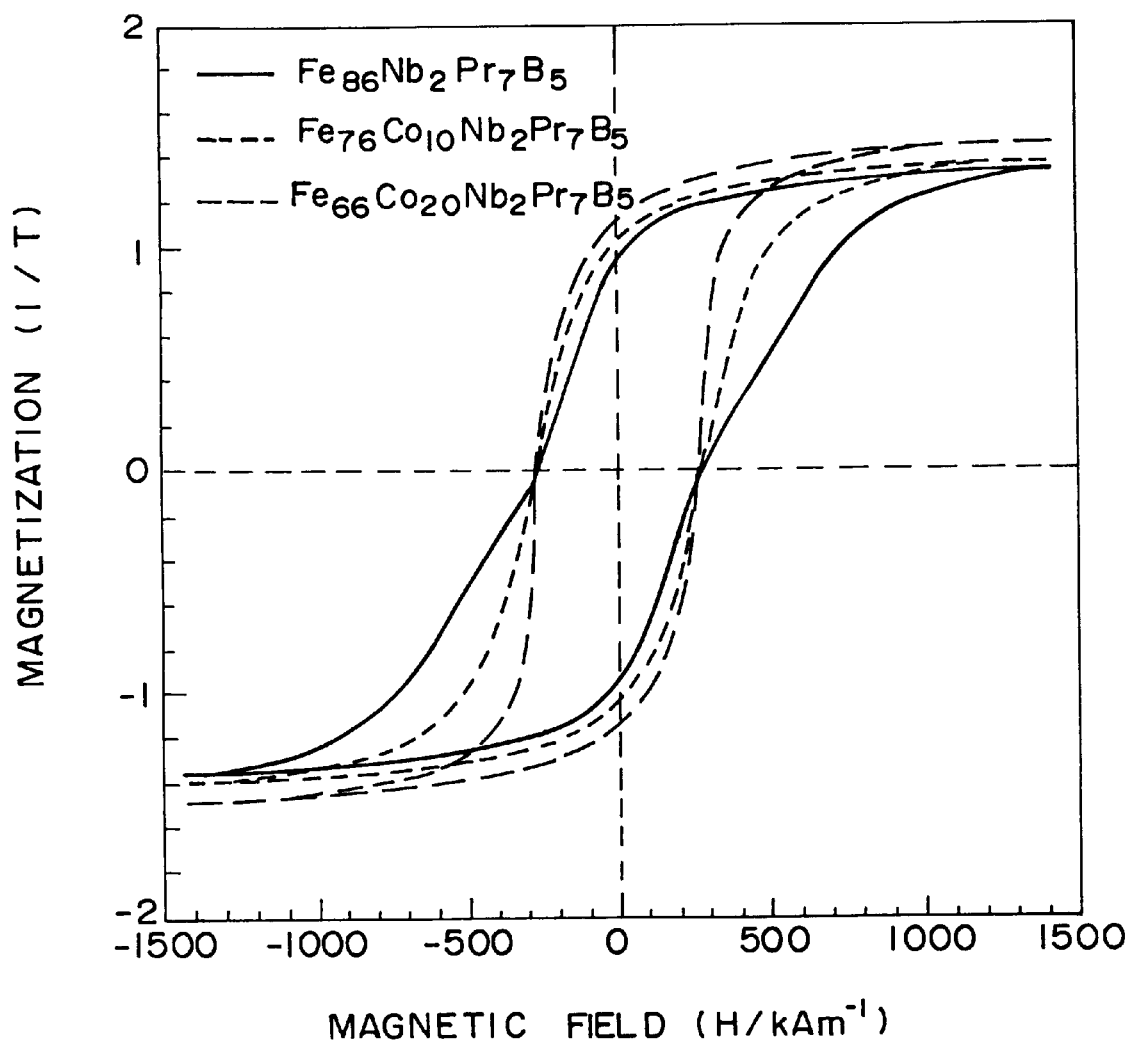
FIG. 24 is a diagram showing the I—H magnetization curves of hard magnetic materials of the present invention.
Figure 25A:
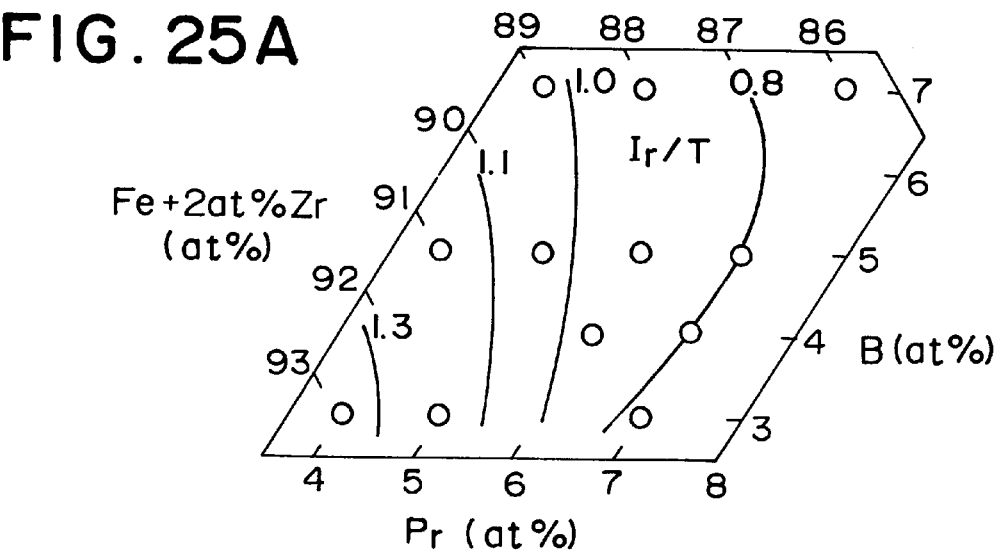
FIGS. 25A, 25B and 25C are triangular composition diagrams showing Ir, iHc and $(BH)_{max}$ of Fe—(Nb, Zr)—(Pr, Nd)—B alloy.
Figure 25B:
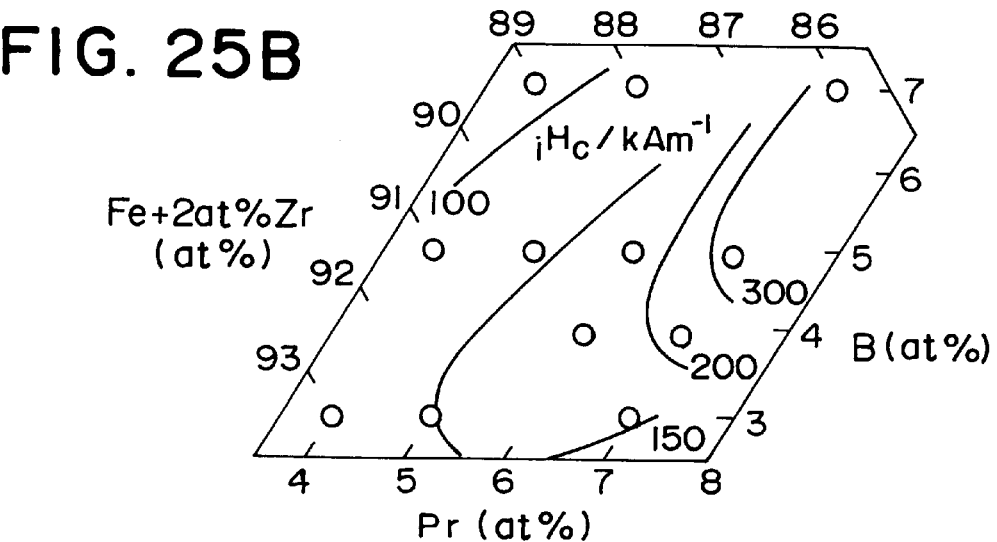
Figure 25C:
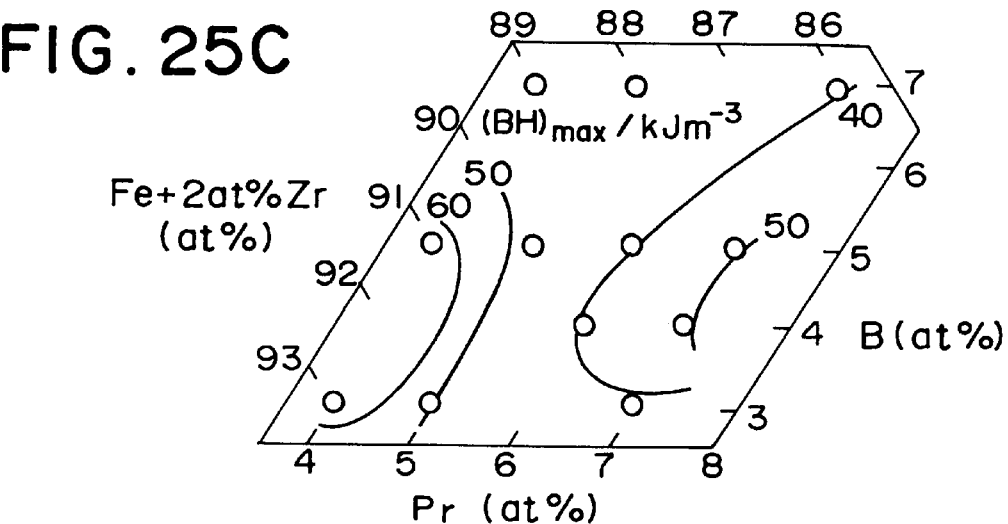
Figure 26A:
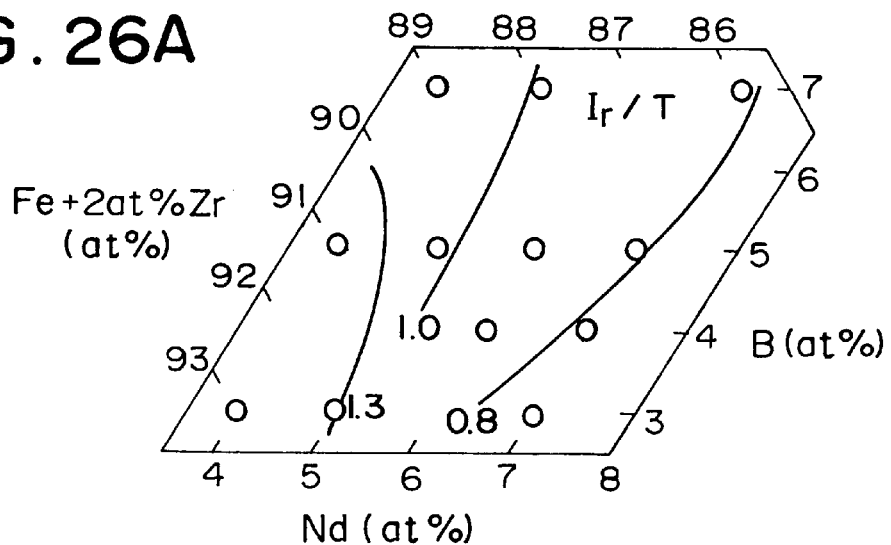
FIGS. 26A, 26B and 26C are triangular composition diagrams showing Ir, iHc and $(BH)_{max}$ of Fe—(Nb, Zr)—(Pr, Nd)—B alloy.
Figure 26B:
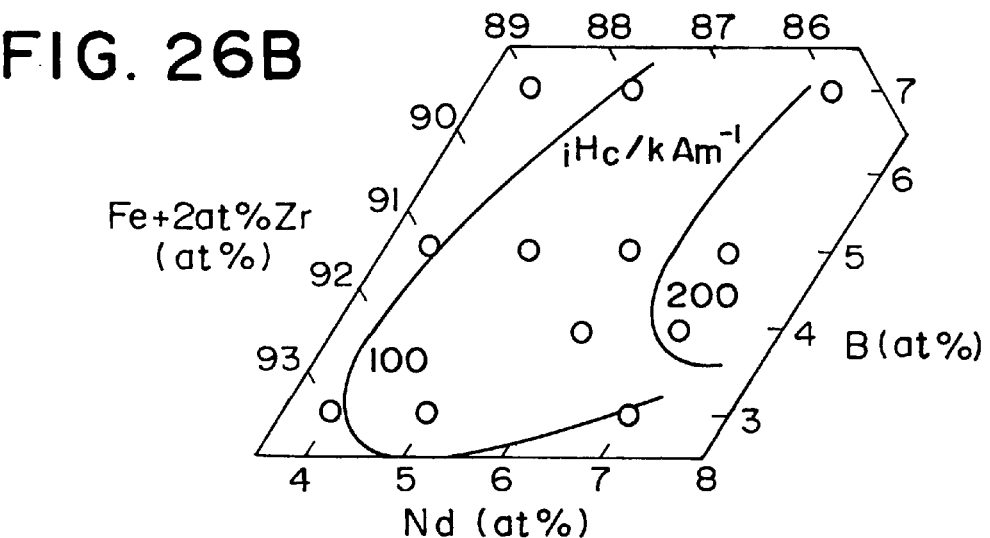
Figure 26C:
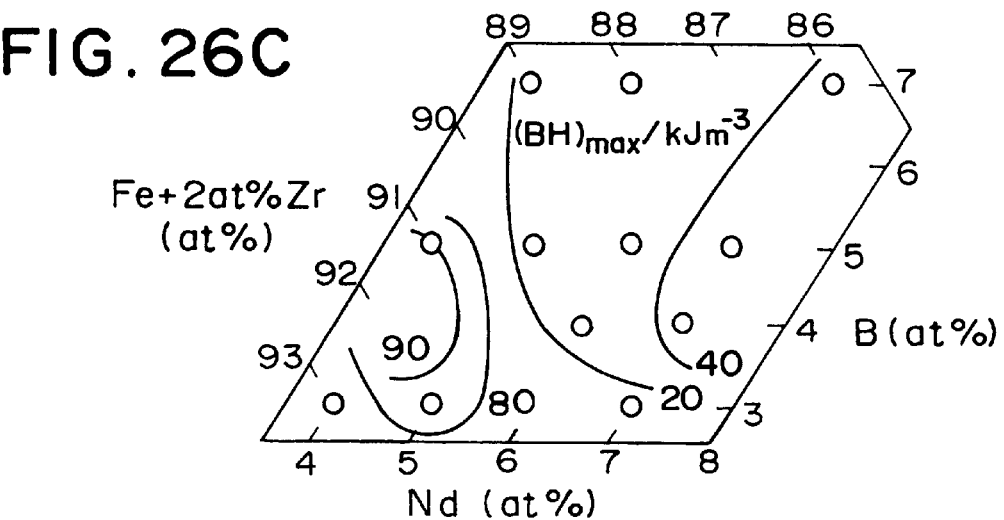
Figure 27A:
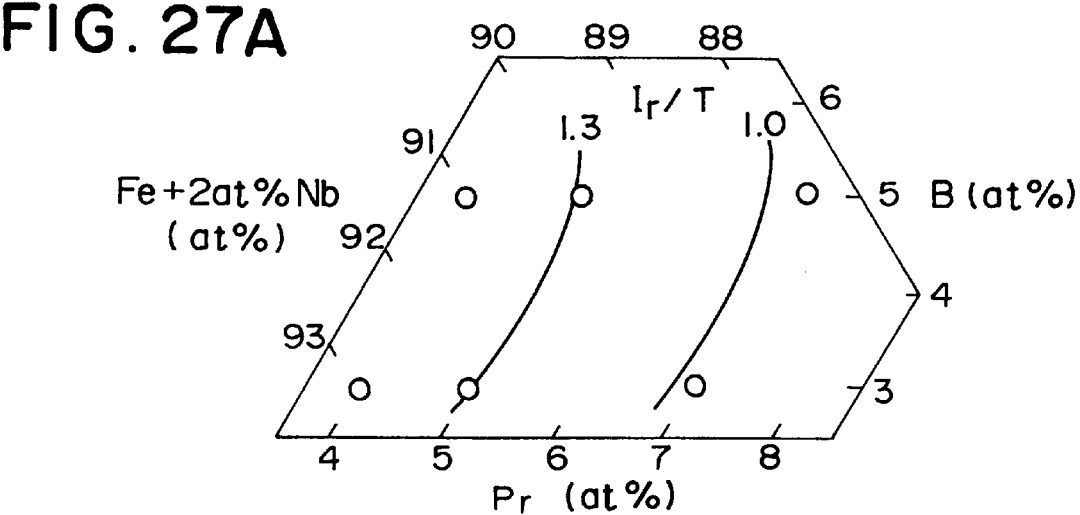
FIGS. 27A, 27B and 27C are triangular composition diagrams showing Ir, iHc and $(BH)_{max}$ of Fe—(Nb, Zr)—(Pr, Nd)—B alloy.
Figure 27B:
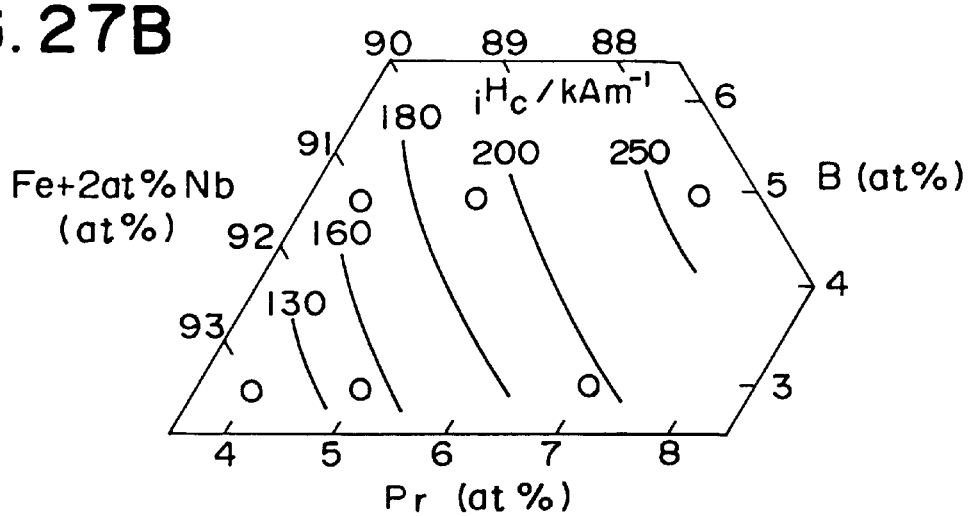
Figure 27C:
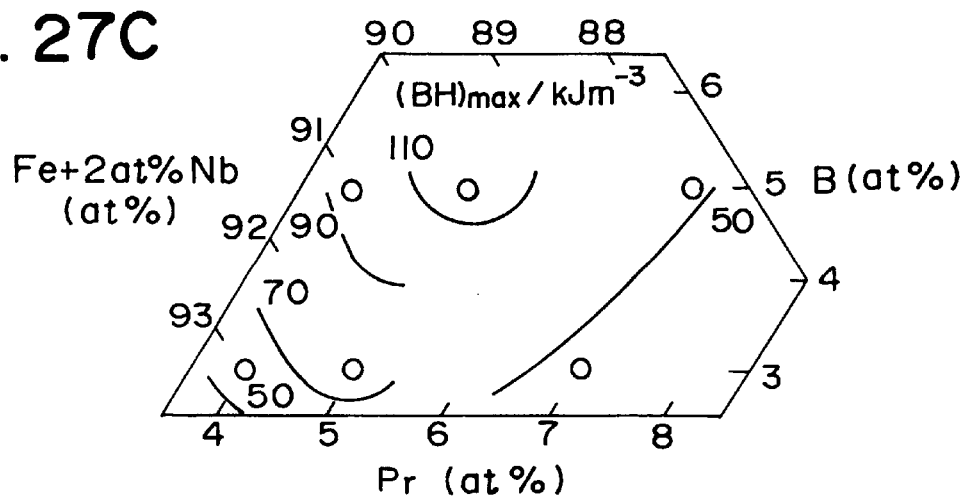
Figure 28A:
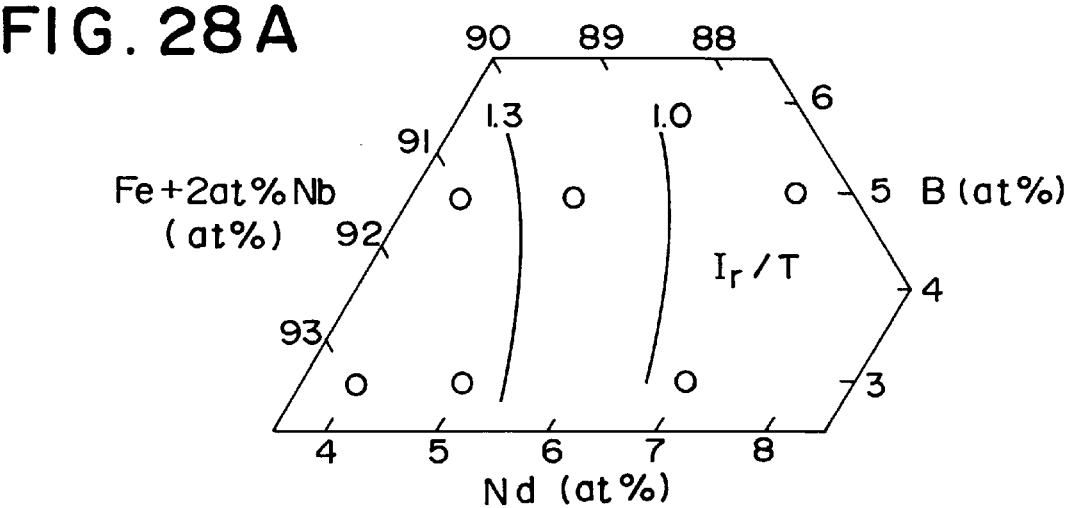
FIGS. 28A, 28B and 28C are triangular composition diagrams showing Ir, iHc and $(BH)_{max}$ of Fe—(Nb, Zr)—(Pr, Nd)—B alloy.
Figure 28B:
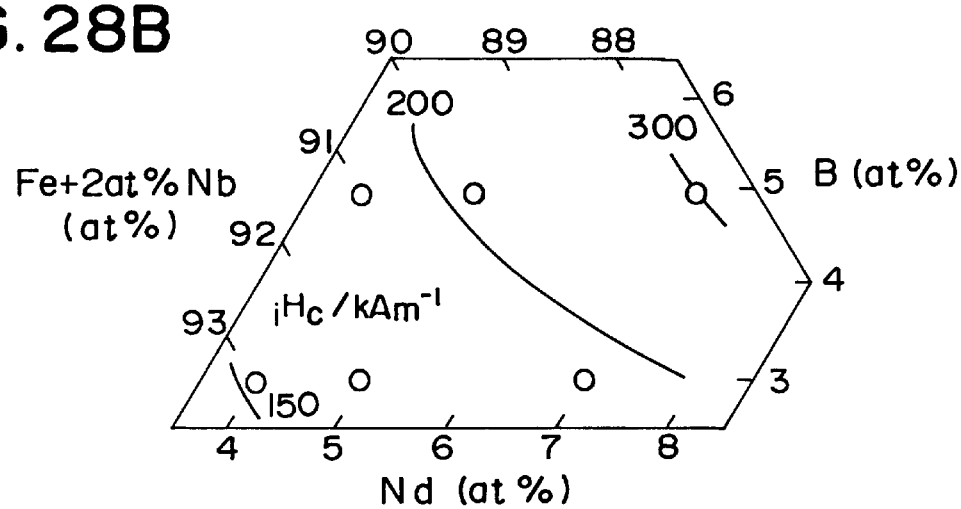
Figure 28C:
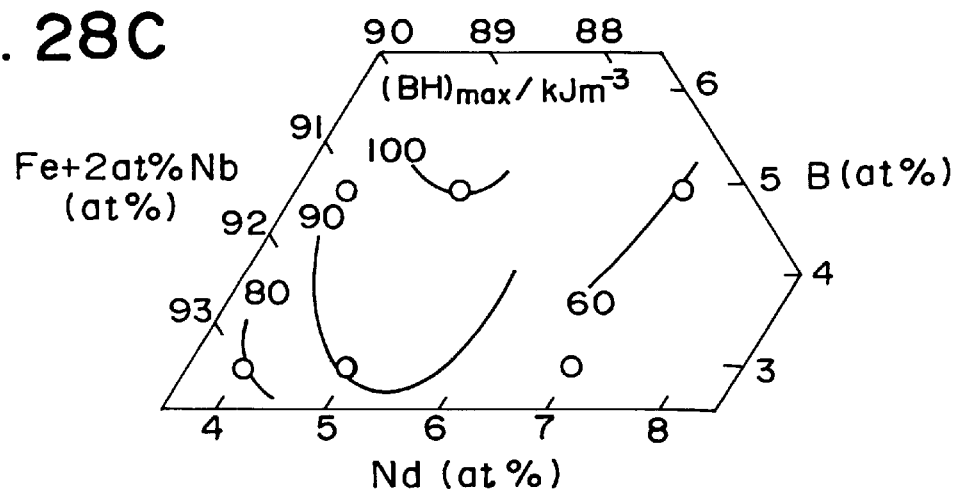

FIG. 24 shows I—H magnetization curves of these alloys. This diagram indicates that the addition of Co causes rapid rising of magnetization and increases (BH)max.

It is recognized by these results that residual magnetic flux density (Ir) and maximum energy product ((BH)max) can be increased by adding at least 2 at %, preferably 2 to 20 at %, of Co to $Fe_{86}CO_2Nb_2Pr_7B_5$ by substituting Fe with Co, without a decrease in coercive force (iHc).

Such hard magnetic materials having high coercive force (iHc), residual magnetic flux density (Ir) and maximum energy product ((BH)max) are suitable for motor magnets.

As described above, the hard magnetic materials of the present invention comprise at least one element of Fe, Co and Ni as a main component, at least one element M of Zr, Nb, Ta and Hf, at least one rare earth element R and B, wherein the texture thereof comprises at least 70% of fine crystalline phase having an average grain size of 100 nm or less, and the residue comprising an amorphous phase, the fine crystalline phase mainly consisting of bcc-Fe or bcc-Fe compound, Fe—B compound and/or $R_2Fe_{14}B_1$.

The hard magnetic materials of the present invention exhibit exchange coupling magnet characteristics obtained by coupling fine soft magnetic phase and hard magnetic phase, which are obtained by realizing a fine texture, high remanent magnetization and excellent hard magnetic characteristics.

The hard magnetic materials preferably have a texture mainly comprising the amorphous phase immediately after quenching, and the fine crystalline phase is precipitated by heat treatment at 600 to 900° C. Therefore, good exchange coupling magnet characteristics can be obtained by securely realizing a fine texture.

With the above-described composition such as $T_xM_yR_zB_w$, even if the content of rare earth elements is low, a good amorphous phase can be obtained by quenching, and a compound producing hard magnetic characteristics is then precipitated by heat treatment. Thus, hard magnetic materials having excellent hard magnetic characteristics can be obtained at low cost. In addition, since the Fe content is lower than that of a conventional rare earth magnet, higher saturation magnetization (Is) and remanent magnetization (Ir) are obtained. Further, high remanent magnetization of 120 emu/t or more can be realized in spite of the low content of rare earth element.

The present invention also can provide hard magnetic materials having a ratio Ir/Is of remanent magnetization to saturation magnetization of 0.1 or more. It is thus possible to realize high Ir and obtain hard magnetic materials having a high energy product.

If the rare earth elements entirely or partly comprise Nd and/or Pr, particularly, high coercive force and remanent magnetization are obtained.

The method of producing the hard magnetic materials of the present invention comprises the steps of forming an amorphous alloy containing Fe as a main component, at least one element M of Zr, Nb, Ta and Hf, at least one rare earth element R and B; and performing heat treatment of the amorphous alloy at 600 to 900° C. to precipitate a fine crystalline phase having an average grain size of 100 nm or less and mainly comprising bcc-Fe, Fe—B compound and/ or $R_2Fe_{14}B_1$.

Therefore, hard magnetic materials exhibiting exchange coupling magnet characteristics are obtained by realizing a fine texture. Since excellent hard magnetic characteristics can be obtained by decreasing the content of rare earth element as compared with a conventional rare earth magnet, hard magnetic materials having high performance can be produced at relative low production cost.

Such hard magnetic materials are useful as magnet materials for various apparatus such as a motor, an actuator, a speaker, etc. and enables an attempt to decrease the production cost.

What is claimed is:

1. A hard magnetic material having the following composition formula:

$T_xM_yR_zB_w$ wherein the texture thereof comprises at least 70% of fine crystalline phase comprising a soft magnetic phase and a hard magnetic phase having an average grain size of 100 nm or less, and the residue comprising an amorphous phase, the soft magnetic phase comprising bcc-Fe or bcc-Fe compound and Fe—B compound and the hard magnetic phase comprising $R_2T_{14}B_1$, and wherein T indicates at least one element of Fe, Co and Ni; M indicates at least one element of Zr, Nb, Ta and Hf; R indicates at least one rare earth element; and x, y, z and w respectively indicates the composition ratios satisfying the conditions below:

$86 \leq x, 0.5 \leq y \leq 3, 3 \leq z \leq 7, 3 \leq w \leq 7$.

2. A hard magnetic material according to claim 1, wherein the content of the rare earth element is 3 to 5 at %.

3. A hard magnetic material according to claim 1, wherein the texture is formed by preparing an amorphous alloy by a liquid quenching method and precipitating the texture from the amorphous alloy by applying heat treatment, and wherein the texture comprises at least 70% of the soft magnetic phase having an average grain size of 100 nm or less and comprising bcc-Fe or bcc-Fe compound and Fe—B compound and the hard magnetic phase having an average crystal grain size of 100 nm or less and comprising of $R_2T_{14}B_1$.

4. A hard magnetic material according to claim 1, wherein the texture mainly comprises an amorphous phase immediately after quenching, and the fine crystalline phase is precipitated by heat treatment at 600 to 900° C.

5. A hard magnetic material according to claim 1, wherein the ratio Ir/Is of remanent magnetization Ir to saturation magnetization Is is 0.7 or more.

6. A hard magnetic material according to claim 1, wherein all or part of the rare earth element is Nd and/or Pr.

7. A hard magnetic material having the following composition formula and having remanent magnetization Ir of 120 emu/g or more:

$T_xM_yR_zB_w$ wherein the texture thereof comprises at least 70% of fine crystalline phase comprising a soft magnetic phase and a hard magnetic phase having an average grain size of 100 nm or less, and the residue comprising an amorphous phase, the soft magnetic phase comprising bcc-Fe or bcc-Fe compound and Fe—B compound and the hard magnetic phase comprising $R_2T_{14}B_1$, and wherein T indicates at least one element of Fe, Co and Ni; M indicates at least one element of Zr, Nb, Ta and Hf; R indicates at least one rare earth element; and x, y, z and w respectively indicates the composition ratios satisfying the conditions below:

$86 \leq x, 0.5 \leq y \leq 3, 3 \leq z \leq 7, 3 \leq w \leq 7$.

8. A hard magnetic material according to claim 7 wherein the content of the rare earth element is 3 to 5 at %.

9. A hard magnetic material according to claim 7, wherein the texture is formed by preparing an amorphous alloy by a liquid quenching method and precipitating the texture from the amorphous alloy by applying heat treatment, and wherein the texture comprises at least 70% of the soft magnetic phase having an average grain size of 100 nm or less and comprising bcc-Fe or bcc-Fe compound and Fe—B compound and the hard phase having an average crystal grain size of 100 nm, or less and comprising $R_2T_{14}B_1$.

10. A hard magnetic material according to claim 7, wherein the texture mainly comprises an amorphous phase immediately after quenching, and the fine crystalline phase is precipitated by heat treatment at 600 to 900° C.

11. A hard magnetic material according to claim 7, wherein the ratio Ir/Is of remanent magnetization Ir to saturation magnetization Is is 0.7 or more.

12. A hard magnetic material according to claim 7, wherein all or part of the rare earth element is Nd and/or Pr.

13. A hard magnetic material according to claim 1, wherein said hard magnetic material comprising exchange coupling magnetic characteristics.

14. A hard magnetic material according to claim 7, wherein said hard magnetic material comprising exchange coupling magnetic characteristics.

\* \* \* \* \*